United States Patent
Monichino et al.

(10) Patent No.: US 10,627,301 B2
(45) Date of Patent: Apr. 21, 2020

(54) SENSOR FOR DETECTING ONE OR MORE QUANTITIES OF A FLUID, IN PARTICULAR A PRESSURE SENSOR

(71) Applicant: Metallux SA, Mendrisio (CH)

(72) Inventors: Massimo Monichino, Mendrisio (CH); Stefania Grandis, Mendrisio (CH)

(73) Assignee: METALLUX SA, Mendrisio (CH)

( * ) Notice: Subject to any disclaimer, the term of this patent is extended or adjusted under 35 U.S.C. 154(b) by 393 days.

(21) Appl. No.: 15/566,136

(22) PCT Filed: Apr. 15, 2016

(86) PCT No.: PCT/IB2016/052153
§ 371 (c)(1),
(2) Date: Oct. 12, 2017

(87) PCT Pub. No.: WO2016/166712
PCT Pub. Date: Oct. 20, 2016

(65) Prior Publication Data
US 2018/0113042 A1      Apr. 26, 2018

(30) Foreign Application Priority Data
Apr. 16, 2015   (IT) .................. 102015000012046

(51) Int. Cl.
*G01L 19/14*       (2006.01)
*G01L 19/00*       (2006.01)
(Continued)

(52) U.S. Cl.
CPC ........ *G01L 19/0076* (2013.01); *G01L 9/0051* (2013.01); *G01L 19/142* (2013.01);
(Continued)

(58) Field of Classification Search
CPC .. G01L 9/0051; G01L 19/147; G01L 19/0084
See application file for complete search history.

(56) References Cited

U.S. PATENT DOCUMENTS

| | | |
|---|---|---|
| 4,658,651 A * | 4/1987 | Le .................. G01L 1/2293 29/621.1 |
| 9,759,620 B2 * | 9/2017 | Monichino ........... G01L 19/148 |
| (Continued) | | |

FOREIGN PATENT DOCUMENTS

| | | |
|---|---|---|
| WO | 2010134043 A1 | 11/2010 |
| WO | 2014/097255 A2 | 6/2014 |

OTHER PUBLICATIONS

Patent Cooperation Treaty, Notification of Transmittal of the International Search Report and the Written Opinion of the International Searching Authority, or the Declaration for PCT/IB2016/052153 dated Jun. 27, 2016, 12 pages.

*Primary Examiner* — Herbert K Roberts
(74) *Attorney, Agent, or Firm* — Heslin Rothenberg Finley & Mesiti P.C.; Victor A. Cardona, Esq.

(57) ABSTRACT

A sensor has a sensor body with a first face and a second face opposite to one another, and a circuit arrangement supported by the sensor body that includes a first electrical circuit pattern on the first face, a second electrical circuit pattern on the second face, connection means, which electrically connect the first circuit pattern to the second circuit pattern and has at least one through hole that extends axially between the two faces of the sensor body. A plurality of terminals are electrically connected to the first circuit pattern and/or the second circuit pattern. The at least one through hole is preferably closed at the second face of the sensor body via a closing member (30) having pre-formed body with a closing portion having a diameter, greater than a diameter, of the opening of the through hole at the second face of the sensor body.

18 Claims, 12 Drawing Sheets

(51) Int. Cl.
  *G01L 9/00*         (2006.01)
  *H01R 13/443*    (2006.01)
(52) U.S. Cl.
  CPC .......... *G01L 19/148* (2013.01); *H01R 13/443* (2013.01); *G01L 9/0052* (2013.01); *G01L 19/0084* (2013.01); *G01L 19/147* (2013.01)

(56) References Cited

U.S. PATENT DOCUMENTS

| | | |
|---|---|---|
| 2007/0246819 A1 | 10/2007 | Hembree et al. |
| 2011/0138921 A1* | 6/2011 | Colombo ............ G01L 19/0038 73/706 |
| 2011/0138924 A1* | 6/2011 | Colombo ............ G01L 19/0084 73/756 |
| 2012/0104518 A1* | 5/2012 | Salmaso ............... G01L 9/0042 257/415 |

* cited by examiner

SENSOR FOR DETECTING ONE OR MORE QUANTITIES OF A FLUID, IN PARTICULAR A PRESSURE SENSOR

CROSS REFERENCE TO RELATED APPLICATIONS

This application is a national stage filing under section 371 of International Application No. PCT/IB2016/052153, filed on Apr. 15, 2016, published in English on Oct. 20, 2016, as WO2016/166712 A1 and which claims priority to Italian Application No. 102015000012046, filed on Apr. 16, 2015, the entire disclosure of these applications being hereby incorporated herein by reference.

FIELD OF THE INVENTION

The present invention relates in general to sensors and to electronic circuits for detecting one or more quantities of a fluid, such as for example pressure sensors, and has been developed with particular reference to sensors and circuits comprising at least one body made of electrically insulating material, such as a ceramic or polymeric material. The invention finds preferred application in sensors having a body that comprises at least one flexible or movable part, in particular a body with a cavity and at least one membrane in a position corresponding to the cavity.

PRIOR ART

Some sensors of the type referred to are used in devices for detecting the pressure of fluids (liquids and aeriforms) in various sectors, such as the automotive sector, the domestic sector and sector of electrical household appliances, and the HVAC, plumbing, and sanitary sector. These sensing devices typically comprise a casing or a support, defining at least one housing with an inlet for a fluid of which the pressure is to be measured, as well as a pressure sensor set in the housing so that a sensitive portion thereof is exposed to the fluid, typically a portion comprising a membrane.

The pressure sensor has a sensor body, in general made of electrically insulating material, with an axial cavity that is closed at at least one end by the aforesaid membrane portion. In some sensors of a first type, which are generally referred to as "relative sensors", the axial cavity is substantially a blind cavity, which is closed at a face of the sensor body, here defined for simplicity as "upper face". The axial cavity opens, instead, at the opposite face of the sensor body, here defined as "lower face", and is set in fluid communication with the inlet of the device. In sensors of a second type, which are generally referred to as "absolute sensors", the cavity is, instead, substantially closed at both of its opposite ends, at one of these there being provided the membrane portion, the outer side of which is exposed to the fluid. Also known are pressure sensors of a third type, for example sensors having a body with a structure substantially similar to that of the sensors of the aforesaid second type, where, however, the cavity of the sensor body is set in fluid communication with the external environment or with another reference pressure, via at least one passage defined in a part thereof different from the corresponding membrane portion.

The sensor body may be monolithic or else made up of a number of parts. For instance, in the case of a sensor of the first type mentioned, the sensor body may be monolithic, in order to define integrally the blind cavity with the corresponding membrane portion, or else may comprise an axially hollow body, fixed at one end of which is a membrane element in order to close the aforesaid cavity at one side. The body of a sensor of the second type or third type referred to is generally made up of a number of parts, for example including a main body that defines at least a part of a cavity, closed by a further body that defines the membrane. In the case of a sensor of the second type, the cavity is blind, closed at one end (such as the upper face) by a portion of the body itself and closed at the other end (such as the lower face) by a membrane portion applied to the main body. In the case of sensors of the third type, the main body is perforated, preferably at the end opposite to the membrane part. In the case of sensors of the aforesaid second type, the end opposite to the membrane part may hence be without holes in order to provide a pressure sensor of an absolute type. In sensors of the aforesaid third type, instead, the upper face may have a hole in order to set the cavity of the sensor body in communication with the external environment or other pressure reference in order to provide a pressure sensor of a relative or differential type.

The sensor body supports a circuit arrangement, which in general includes terminals for connection of the sensor to an external system, and a circuit pattern made of electrically conductive material, typically deposited on the side of the membrane portion protected from the fluid, for example the side external to the cavity in the case of sensors of the first type, or on the side of the membrane portion facing the cavity in the case of sensors of the second and third types.

Associated to the above circuit pattern are one or more circuit components—for example, piezoelectric, piezo-resistive, resistive, or capacitive components—designed to detect bending or deformation of the membrane portion, which depends upon the pressure of the fluid.

In some applications, provided on the face of the sensor body opposite to the membrane portion is a further circuit pattern belonging to the circuit arrangement, which is also obtained by deposition of electrically conductive material. Also to this second circuit pattern there may be associated one or more circuit components of the circuit arrangement.

For instance, WO 2010/134043 A, filed in the name of the present Applicant, describes a pressure sensor of the second type referred to above, in particular of an absolute type, the sensor body of which comprises a first part defining a blind cavity and a second part that is fixed with respect to the first part so as to close the aforesaid cavity.

An inner side the second part, which provides a deformable membrane, has a first circuit pattern, connected to which are the means for detecting deformation of the membrane, for example of the type referred to above. Provided on the upper face of the first part of the sensor body—i.e., the face opposite to the second body part—are the connection terminals of the sensor and a second circuit pattern, connected to which are other electrical and/or electronic components of the circuit arrangement for control of the sensor (for example, a microcontroller, amplification components, calibration components, filtering components, connection terminals, etc.). The two circuit patterns are connected together by electrically conductive means that extend in an axial direction of the sensor body. More in particular, the first part of the sensor body has axial through holes, in a position peripheral with respect to the corresponding blind cavity, with the inner surface of these holes that is coated with a layer of electrically conductive material. One end of this conductive layer is hence located in a position corresponding to the portion of the lower face of the first body part that surrounds the opening of the blind cavity and is connected to at least one electrically conductive track of the aforesaid first circuit pattern deposited on the inner side of the second body part, i.e., the sensing membrane. The other end of the conductive layer is located, instead, at the upper face of the first body part, opposite to the membrane, and is connected to at least one track of the aforesaid second circuit pattern. In this way, the two circuit patterns are electrically connected together and/or to the terminals.

A similar solution is known also from WO 2014/097255 A, filed in the name of the present Applicant, on which the preamble of claim 1 is based. This document describes a pressure sensor of the first type referred to above, with a monolithic sensor body that defines a blind cavity, closed at one face of the body by a membrane portion. Provided on the outer side of the membrane portion are the connection terminals and a first circuit pattern, with associated thereto the components for detecting deformation, whereas provided on the opposite face of the body, in a position peripheral with respect to the opening of the cavity, is a second circuit pattern, for connection of a component for detecting a quantity of the fluid that is to be measured, in particular a temperature sensor. The temperature sensor is mounted so that at least its sensitive part is exposed directly to the fluid, substantially in front of the opening of the cavity, for carrying out a direct detection of the quantity of interest. Also in this case, the two circuit patterns are connected together by means of metallized holes, i.e., holes that traverse the sensor body in a peripheral position with respect to the blind cavity, in which an electrically conductive material is contained. This material projects on the outside of the holes, at the corresponding ends, in order to be in electrical contact with respective track of the two circuit patterns. In the case of the pressure sensor of WO 2010/134043, even though the metallized holes are in any case hollow (given that the thickness of the conductive layer that covers the surfaces thereof is modest), there is no risk of passage through them of the fluid that is to be measured. In fact, in this application, the ends of the metallized holes at the lower face of the first part of body are obstructed or in any case isolated from the fluid by the second body part that defines the membrane.

Also in the case of WO 2014/097255 A, the metallized holes are empty, and their ends at the lower face of the sensor body are obstructed via a protective layer of electrically insulating material, that is to cover for the most part the corresponding second circuit pattern, to which the temperature sensor is connected. In any case, in the pressure sensor referred to in the prior document in question, the area of the lower face of the sensor body where the bottom ends of the metallized holes are located is isolated from the fluid by virtue of the presence of an annular seal. This seal provides for axial fluid-tightness on the aforesaid protective layer so as to circumscribe a volume that can be occupied by the fluid that is to be measured, and the area where the ends of the metallized holes closed by the protective layer are located is in any case outside this volume, thus not being reachable by the fluid.

In a possible variant embodiment of WO 2014/097255, at least one of the metallized holes is defined in the sensor body so that its end at the lower face is located within the region circumscribed by the aforesaid seal, i.e., in a position that can be reached by the fluid. For this reason, according to the variant in question, the metallized hole referred to is filled with a conductive material. Total filling of the hole may, however, prove problematical on account of the capillary dimensions, i.e., the very small diameter, of the hole with the risk that, albeit apparently plugged on the outside, in the inside air bubbles or cavities not filled by the conductive material are present, which are difficult to detect. This solution is moreover relatively costly, in so far as complete filling of the through hole or holes of the sensor body implies the use of a significant amount of conductive material, which in the case of pressure sensors is typically an alloy with a base of noble or in any case costly metals, such as a silver-palladium alloy. For this reason, in practice, the metallized holes may be filled only partially, i.e., only at the end of interest.

The present applicant has, however, found that in sensors obtained in this way, when these are used in combination with high-pressure fluids or in the presence of sudden pressure increases of considerable amount, there may occur in an altogether unforeseeable way deformations and/or extrusions of the material used for plugging the metallized hole. These deformations may create passages that set in communication the two opposite faces of the sensor body, i.e., that set in communication the face exposed to the fluid with the opposite face, which should, instead, remain protected and isolated, on account of the presence of circuit components that are unsuited for coming into contact with the fluid to be detected.

For a better understanding of this problem, FIG. 1A is a schematic illustration, at an enlarged scale, of a sensor body SB provided with a through hole TH, the cylindrical surface of which is coated with a conductive layer CC, as mentioned previously. An end of the metallized hole TH-CC corresponding to the face UF of the sensor body SB exposed to the fluid is plugged via a mass of filler material PB deposited locally. The material PB may be an electrically conductive material, or else a resin, or other electrically insulating material. The filling mass is formed by depositing at the bottom of the metallized hole a drop of the material in question in the molten or liquid state.

As explained above, in the case of use of the sensor in combination with fluids at high pressure or in the presence of temporary increases in the normal working pressure, it may occasionally happen that the mass of material PB is unable to withstand the thrust exerted by the pressure (represented schematically by the arrow designated by P in FIG. 1B), with consequent risk of deformation and/or extrusion of the material that plugs the hole TH. This deformation and/or extrusion may lead also to creation of a passage TP that enables outflow of the fluid through the metallized hole, as highlighted in FIG. 1C, thereby setting in direct communication with the two opposite faces of the sensor body.

AIM AND SUMMARY OF THE INVENTION

The aim of the present invention is basically to overcome the drawbacks mentioned previously in a simple, inexpensive, and reliable way.

The above aim is achieved, according to the invention, by a sensor for detecting at least one physical quantity of a fluid, in particular a pressure, and by a device integrating such a sensor, which have the characteristics referred to in the annexed claims, the claims forming an integral part of the technical teaching provided in relation to the invention.

BRIEF DESCRIPTION OF THE DRAWINGS

Further aims, characteristics, and advantages of the present invention will emerge clearly from the ensuing detailed description and from the annexed drawings, which are provided purely by way of explanatory and non-limiting example and in which.

DESCRIPTION OF PREFERRED EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various points of this description, do not necessarily all refer to one and the same embodiment. In the framework of the present description, where not otherwise specified or when not immediately evident from the context described, definitions of position such as "top", "bottom", "upper", "lower", "lateral" and the like are meant to refer to the arrangement illustrated in a given figure. Moreover, particular configurations, and/or structures, and/or characteristics described may be considered individually or combined in any adequate way, in one or more embodiments, even different from the embodiments described hereinafter by way of non-limiting example. The references used in what follows are provided only for convenience and do not define the sphere of protection or the scope of the embodiments.

In FIGS. 2-5, designated as a whole by 1 is a sensor for detecting at least one quantity of a fluid according to an embodiment of the present invention. In the example illustrated, the sensor is a pressure sensor, in particular a pressure sensor of the first type referred to in the introductory part of the present description. The sensor 1 has a sensor body 2, preferably made of electrically insulating material, such as a ceramic material or the like, for example alumina, or a polymeric material. The body 2 is preferably monolithic with two opposite faces 2a and 2b and a peripheral face 2c, for example with a generally cylindrical shape. In embodiments not represented herein, the body 2 may have a shape different from the one exemplified, for example generally parallelepipedal or prismatic. The sensor body 2 may also comprise a number of parts associated to one another, for example glued or welded, such as a tubular or axially hollow part and a membrane part fixed at one end of the tubular part, or again—in the case of a sensor of the second type, as referred to in the introductory part—may include a main part defining a blind cavity and an additional membrane element, for example glued, for closing the aforesaid blind cavity; alternatively, the aforesaid main part may include a passage in order to provide a pressure sensor of the third type described in the introductory part.

Figure 2:
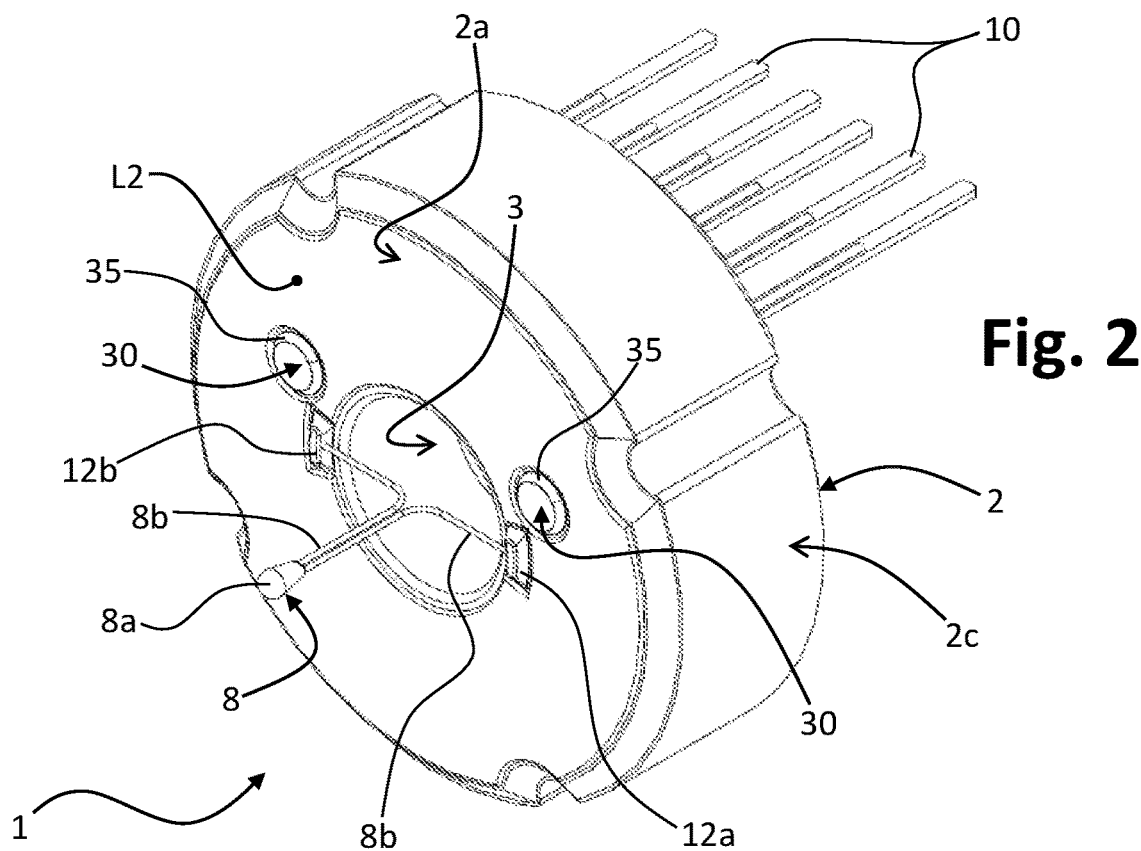
FIGS. 2 and 3 are schematic perspective views of a pressure sensor according to an embodiment of the invention.
Figure 5:
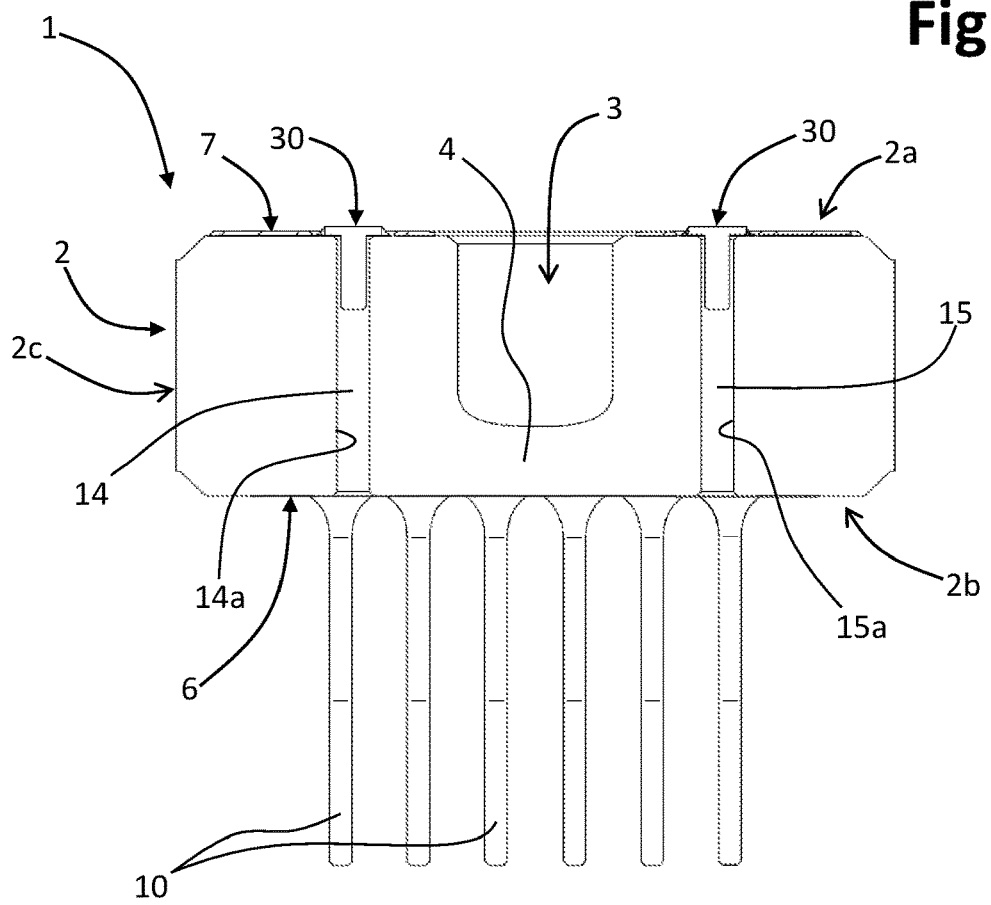
FIG. 5 is a schematic cross-sectional view according to the line V-V of FIG. 4.
Figure 8:
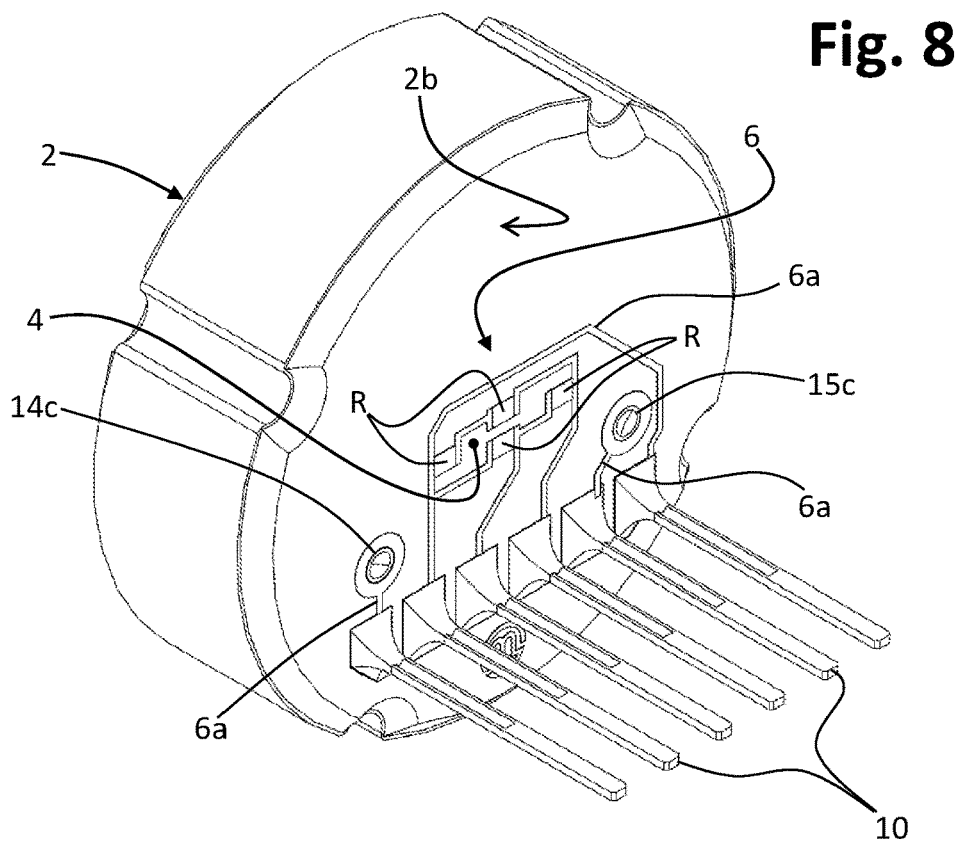
FIG. 8 is a schematic perspective view of a pressure sensor according to an embodiment of the invention, with a corresponding protective layer removed.
Figure 9:
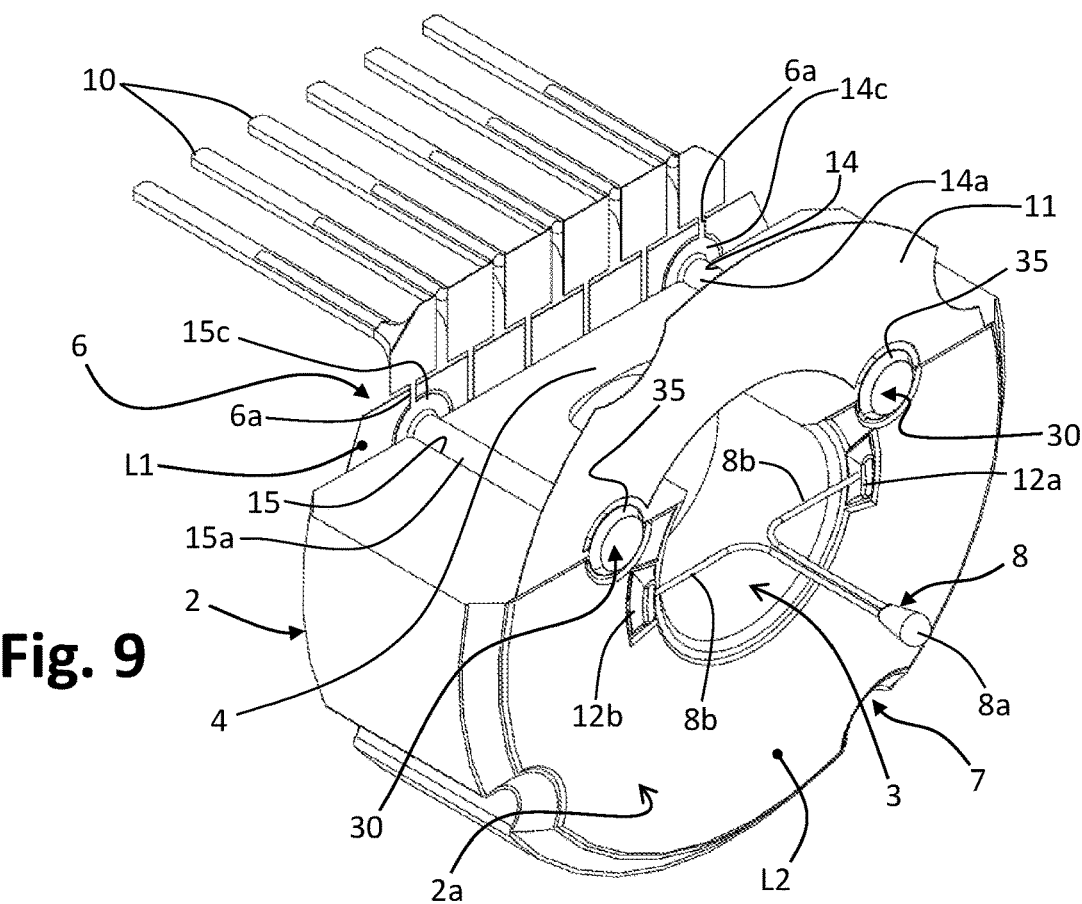
FIG. 9 is a schematic, partially sectioned, perspective view of a pressure sensor according to an embodiment of the invention.

Defined in the body 2 is an axial blind cavity, designated by 3 in FIGS. 2 and 5. The cavity 3 is closed at the end face 2b of the body 2 by a corresponding elastically deformable portion, which is designated by 4 in FIG. 5 (see also FIGS. 8 and 9) and is referred to hereinafter also as "membrane portion", and is instead open at the opposite end face 2a. The thickness of the elastically deformable membrane portion 4 may be predefined according to the pressure range to be measured and/or to the maximum pressure that the sensor has to withstand, in particular envisaging a thickness of the portion 4 that is greater, the higher the pressure to which the device is subjected. Preferably, a thickness of the membrane portion 4 comprised between ⅓ and ⅕ of the thickness of the body 2 is envisaged. The cavity 3 is designed to receive, through its opening corresponding to the face 2a, a fluid, for example a liquid or a gas, of which at least one quantity is to be detected, here represented by a pressure.

The pressure sensor 1 comprises a circuit arrangement supported by the sensor body 2. This arrangement is represented in a partial and schematic way in FIGS. 6 and 7, in isolation from the sensor body, where it is designated as a whole by 5. The circuit arrangement 5 comprises a first electrical circuit pattern, designated as a whole by 6 in FIGS. 6 and 7, designed to be at the face 2b of the body 2. The circuit pattern 6 comprises a plurality of tracks made of electrically conductive material, for example a metal or a metal alloy (such as a silver-palladium alloy), preferably silk-screen printed or in any case deposited on or associated to the face 2b of the body 2, on its side external to the cavity 3, as is visible, for example, in FIG. 8. Some of the aforesaid tracks are designated by 6a in FIGS. 6-8. Consequently, in the preferred embodiment, the insulating material constituting the body 2 is exploited directly as substrate for at least part of the circuit arrangement 5.

Connected to the circuit pattern 6 is a plurality of corresponding circuit components, comprising means for detecting bending or deformation of the membrane 3, for example of any type known in the sector, as mentioned in the introductory part, such as a bridge of resistors, or piezo-resistors, or piezo-resistive elements, referred to hereinafter for brevity also as "resistances", irrespective of the corresponding connection or configuration.

Also one or more of these components may be directly formed on the face 2*b*, for example in the form of screen-printed or deposited resistances. By way of example, in FIGS. 7 and 8 designated by R are four resistances forming parts of a sensing bridge, made of resistive or piezo-resistive material (for example, a resistive or piezo-resistive paste) deposited on the face 2*b* at the membrane portion 3, in particular in a region thereof subject to elastic deformation, and connected to respective tracks 6*a* of the circuit pattern 6. In the case exemplified, the control electronics of the pressure sensor 1 is in a remote position and connected to the circuit arrangement 5 via suitable terminals (described hereinafter). In variant embodiments (not illustrated), the control electronics of the sensor may include one or more components—for example, processing components and/or amplification components, such as integrated circuits or chips—supported directly by the sensor body 2 and electrically connected to one of its circuit patterns, in particular to the circuit pattern 6.

Figure 3:
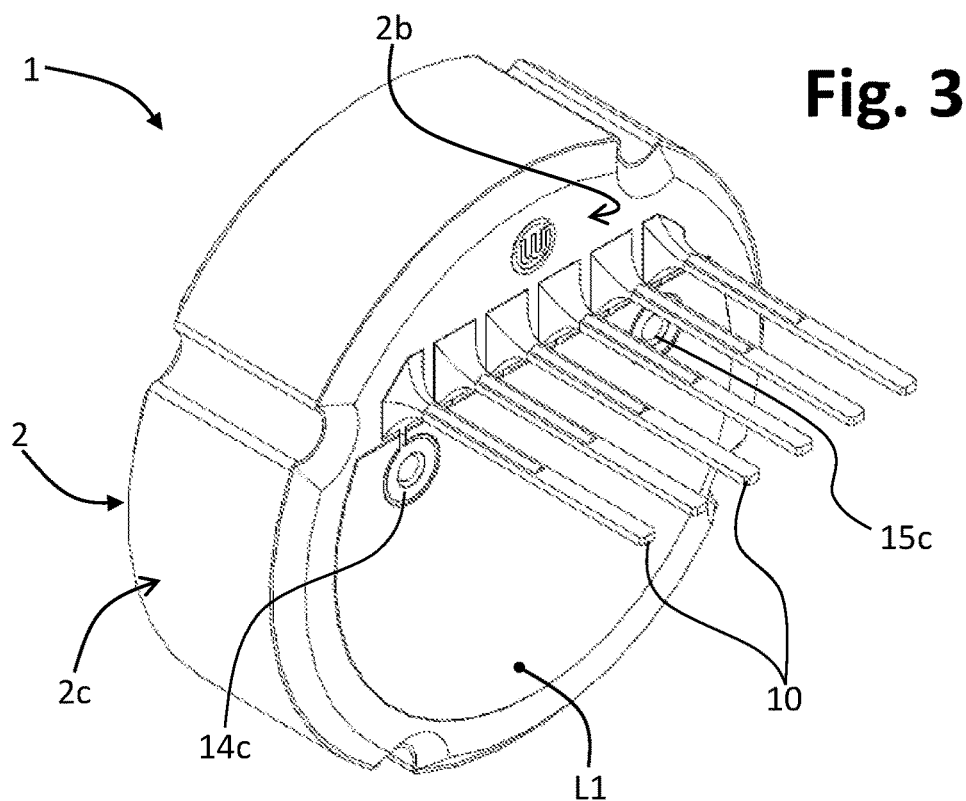
Figure 4:
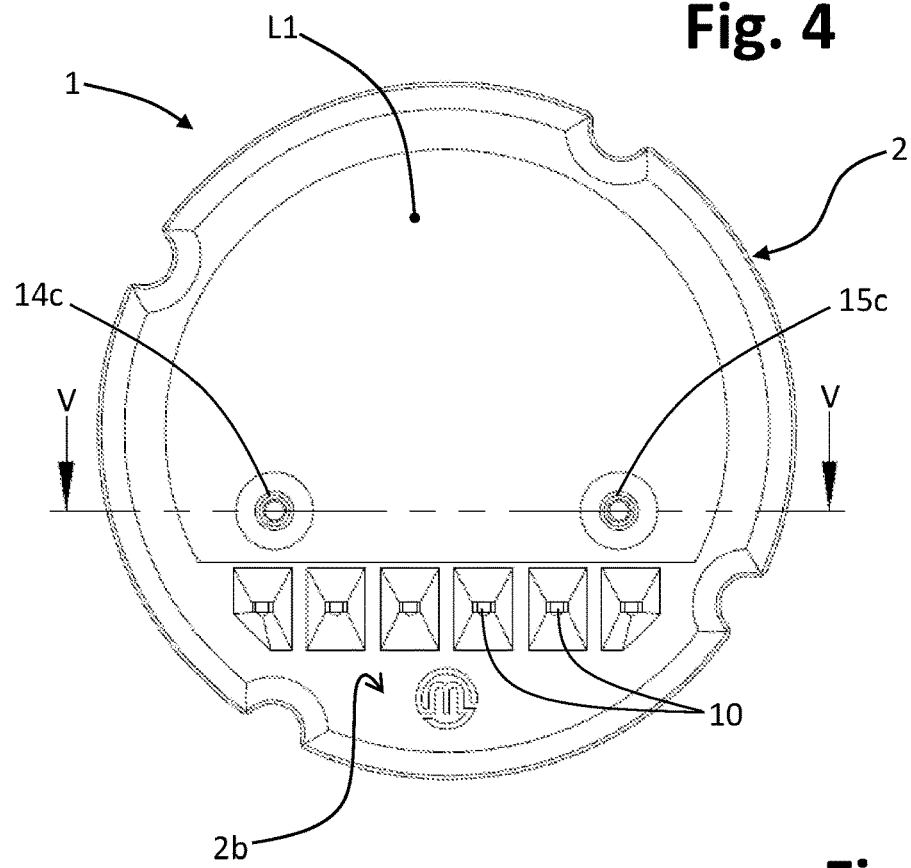
FIG. 4 is a schematic plan view of a pressure sensor according to an embodiment of the invention.

It should be noted that in FIGS. 3 and 4 the circuit pattern 6, with the corresponding components R, is coated with a protective layer L1 of electrically insulating material, such as a layer of polymeric or vitreous material.

Figure 6:
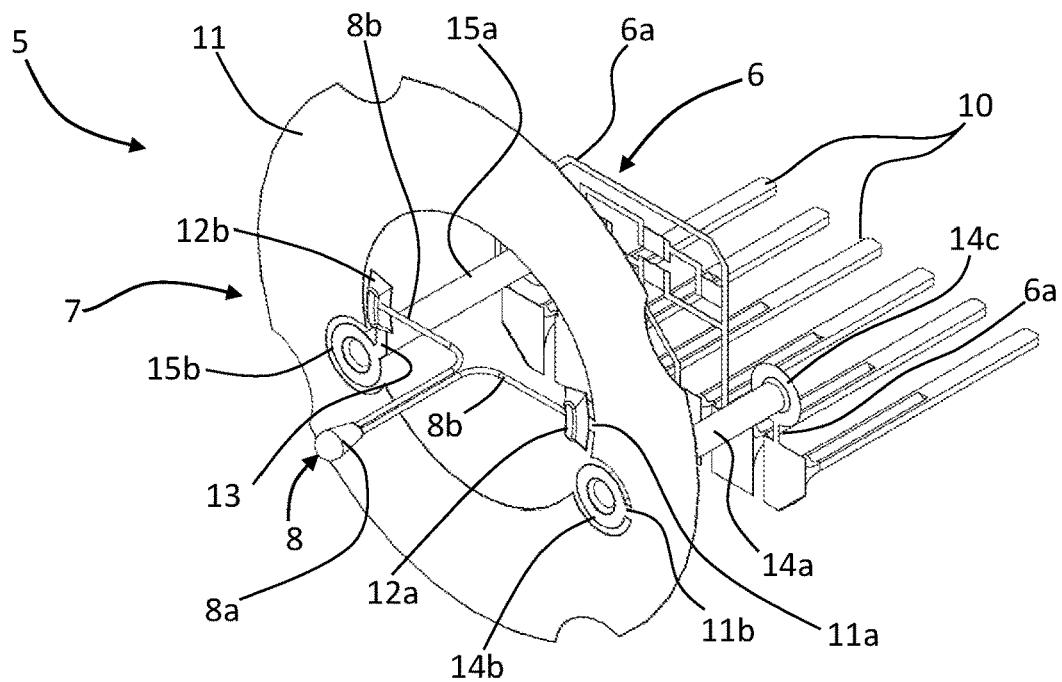
FIGS. 6 and 7 are schematic perspective views of a circuit arrangement of a pressure sensor according to an embodiment of the invention.
Figure 7:
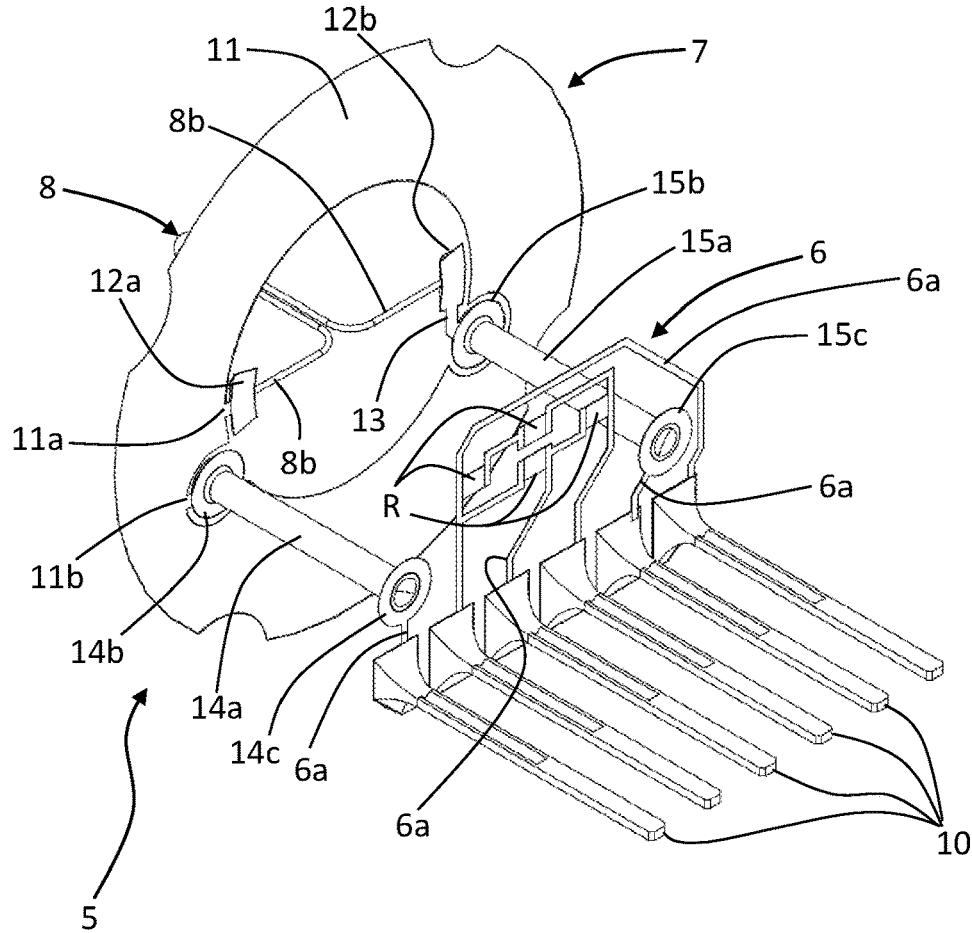

The circuit arrangement 5 comprises a second electrical circuit pattern, designated as a whole by 7 in FIGS. 6 and 7, which is located at the face 2*a* of the body 2. The circuit pattern 7 comprises one or more tracks of electrically conductive material, for example a metal or a metal alloy (such as a silver-palladium alloy), for example silk-screen printed or deposited on, or in any case associated to, a region of the face 2*a* that is in a position peripheral with respect to the opening of the cavity 3.

In various embodiments, one or more of the circuit patterns 6 and 7 comprises/comprise a plurality of tracks of electrically conductive material, such as a metal or a metal alloy, which are fixed or glued or engraved on the respective face 2*b* and 2*a* of the body 2, or else tracks fixed or glued or deposited or silk-screen printed or engraved on a different support, such as a circuit support, associated to the body 2.

In a preferred embodiment, a track of the circuit pattern 7 at least partially surrounds the opening of the cavity 3. In the case exemplified, the track designated by 11 surrounds the opening of the cavity 3 completely. In various embodiments, the aforesaid track has a circular closed-ring shape and is set around the opening of the cavity 3, in particular to define an area resting on which, directly or with interposition of a layer of other material, is a circular sealing element, such as an O-ring.

In one embodiment, electrically connected to the second circuit pattern 7 is at least one circuit component, in particular a sensor means for detecting a physical characteristic or quantity of the fluid other than the pressure. In the example illustrated (see FIGS. 2, 6, and 7), this component—designated as a whole by 8—has an active part 8*a* that is to be exposed to the fluid and at least two connection terminals 8*b*. In a preferred embodiment, the component 8 is a temperature sensor, such as a resistor performing functions of temperature sensor, for example an NTC (negative-temperature coefficient) resistor, the active part 8*a* of which (i.e., the part performing sensing functions) is to be exposed directly to the fluid in order to carry out direct detection of temperature. Not excluded from the scope of the invention is the use of different types of sensors, not necessarily temperature sensors.

With reference to the example shown, the terminals 8*b* of the sensor 8 are in the form of reophores or legs, designed to be soldered to respective connection pads, belonging to the circuit pattern 7. Not excluded from the scope of the invention, instead of components with reophores or legs, is the use of electronic components of a surface-mount (SMD) type, preferably provided with small metal terminals, for example in the form of pads or metallized ends, designed to be soldered directly on conductive tracks of a circuit pattern, in particular using a solder paste. Components of an SMD type that may be used for the purposes of implementation of the invention preferably have small dimensions, also so as to be more easily coated with a possible protective material, such as a thermally conductive but electrically insulating material and/or a material for protection against corrosion.

In embodiments where the pressure sensor according to the invention is designed for possible use in combination with electrically conductive liquids, there may advantageously be provided an appropriate electrical insulation of the electrical parts (such as electrical tracks and components) exposed to the fluid, for example via a protective polymeric coating, or a coating made of vitreous material or some other electrically insulating material; as has been said, this type of protection may be facilitated by the use of electronic components of an SMD type.

It may be noted that in FIG. 2 the circuit pattern 7 is prevalently coated with a protective layer L2 of electrically insulating material, such as a layer of polymeric or vitreous material, which is locally open at pads for connection of the sensor 8, or in any case shaped so as to leave these pads exposed to enable soldering or connection of the terminals of the sensor 8.

In one embodiment (see, for example, FIG. 12), an annular sealing element 9, in particular of an O-ring type, is designed to rest directly on the protective layer L2 and circumscribes a region where the opening of the cavity 3 is located and within which the sensor 8 is positioned.

According to various embodiments (not shown), the protective layer L2 is absent or does not cover the annular track 11 of the circuit pattern 7. In these embodiments, an annular sealing element similar to the one designated by 9, in particular of an O-ring type, is designed to rest directly on the track 11 and circumscribes a region where the opening of the cavity 3 is located and within which the sensor 8 is positioned.

The circuit arrangement 5 moreover comprises contacts or terminals for electrical connection of the sensor 1 to a generic external system (such as the control electronics of the sensor), the contacts or connection terminals of which are connected to electrically conductive tracks of at least one of the circuit patterns 6 and 7. In an embodiment, such as the one represented, terminals (some of which are designated by 10) are provided, which extend longitudinally and are made of electrically conductive material and are mechanically coupled to the face 2*b* of the sensor body 2 in an area that is peripheral with respect to the membrane portion 3 and electrically connected to tracks 6*a* of the circuit pattern 6. In variant embodiments, the terminals may have a different form, for example they may be of an elastic or spring type, or represented by simple pads or contacts, or be obtained according to other techniques in themselves known.

In one embodiment, the circuit pattern 7 comprises a track that defines, or that is electrically connected to, at least one pad, for connection of a terminal or reophore 8b of the circuit component represented here by the sensor 8. In the example shown (see FIGS. 6-7), the aforesaid track, designated by 11, has an annular shape and is obtained by deposition of conductive material, for example of the type mentioned above, on the face 2a of the sensor body, to surround the opening of the cavity 3. Designated by 12a is the aforesaid pad for connection of a reophore 8b of the sensor 8, which is preferably located within the ring defined by the track 11 and is connected to the latter via a corresponding portion of track 11a (see also FIG. 12). The pad 12a preferably has the same thickness as the track 11, but represented in the figures, on its upper side, is a filler material—for example a solder paste—used for electrical and mechanical connection of the corresponding reophore 8b of the sensor 8.

The circuit arrangement 5 further comprises means for electrically connecting together the two circuit patterns 6 and 7, i.e., for connecting the circuit pattern 7 directly or indirectly (via the circuit pattern 6) to one or more respective terminals 10. These connection means comprise at least one track or metallization obtained in a respective through hole of the sensor body 2, which extends axially between the faces 2a and 2b. Preferably, as in the case represented, two of these holes are provided with surface metallization: these holes, which are preferably but not necessarily in positions substantially opposite with respect to the opening of the cavity 3, are designated by 14 and 15 in FIG. 5. Preferably, located on the inner surface of each hole 14 and 15 is a respective layer of electrically conductive material or "metallization", for example of the type already referred to above, which extends throughout the length and/or surface of the corresponding hole, as far as its two ends, preferably coming out therefrom on the faces 2a and 2b of the body 2, in particular to form, or be connected to, respective contact pads, such as circular pads or electrical tracks, possibly forming part of the circuit patterns 6 and/or 7.

Preferably, then, deposition of the material of these layers is carried out in way such that part of the metal or conductive material projects on the outside of the holes 14 and 15, at the corresponding ends and/or the aforesaid respective pads. For simplicity, in what follows, the connection means between the circuit patterns 6 and 7 will be defined also as "metallized holes".

The layers of conductive material in the holes 14 and 15 are designated by 14a and 15a, for example in FIGS. 6 and 7, and preferably have a tubular or hollow cylindrical shape, it being, however, possible for them to have a different configuration. If need be, the holes 14 and 15 could be at least partially filled with other material, such as a soldering material and/or a sealant. The layers 14a, 15a may be obtained with any technique known in the sector, for example via deposition, or silk-screen printing, or filling and suction.

In the same figures, designated by 14b and 15b are the contact pads defined at or connected to the lower ends of the layers 14a and 15a, i.e., at the face 2a of the sensor body 2; designated, instead, by 14c and 15c are the contact pads defined at or connected to the upper ends of the layers 14a and 15a, i.e., at the face 2b the sensor body 2. The pads 14b, 15b, 14c, 15c preferably have an annular shape; i.e., they are open at the centre.

In the embodiment exemplified, as may be noted, for example in FIGS. 6-7, the conductive layer 14a is designed to connect the track 11 of the circuit pattern 7 to a first terminal 10, via a track 6a of the circuit pattern 6. For this purpose, preferably the end pad 14b is connected to the track 11 via a respective portion of track 11b (see also FIG. 12), whereas the end pad 14c is connected to the aforesaid first terminal 10 via a track 6a.

Once again with reference to the embodiment exemplified in FIGS. 6 and 7, designated by 12b is a second pad for connection of the second reophore 8b of the temperature sensor 8. This pad 12b, which is also represented in various figures with the soldering material of the corresponding reophore 8b, is preferably located within the ring defined by the track 11. The pad 12b is electrically insulated from the track 11 and, in the example, is connected to the conductive layer 15a of the hole 15, which is in turn electrically connected to a second terminal 10, via the circuit pattern 6. For this purpose, preferably, the pad 12b is connected, for example via a corresponding conductive track 13 of the circuit pattern 7, to the end pad 15b and hence to the layer 15a (see also FIG. 11), whereas the end pad 15c is connected to the aforesaid second terminal 10 via a further track 6a of the circuit pattern 6. In the case exemplified, the pads 12a, 12b for connection of the temperature sensor 8 are in positions diametrally opposite to the cavity 3, but this does not constitute an essential characteristic, it being possible to locate them in other areas within the track 11.

According to an inventive characteristic, on the face of the sensor body 2 that faces the fluid, here represented by the face 2a, the metallized hole or each metallized hole of the sensor 1 is occluded via a closing member having at least in part a pre-formed body, i.e., a body on at least one portion of which there is bestowed a substantially predefined shape before it is mounted on the sensor body. In the figures, designated for this purpose by 30 are the members for closing the metallized holes 14-14a and 15-15a, a possible embodiment of which is illustrated in FIGS. 13-16, where the pre-formed body is designated by 30a.

In a preferred embodiment, the pre-formed body 30a of each member 30 has at least one closing portion 31. In various embodiments, the closing portion 31 is cylindrical or shaped like a disk having a diameter $D_1$ larger than that of the corresponding hole 14 or 15, or else comprises at least one circular part having such a diameter $D_1$ that is designed to rest on at least one corresponding pad 14b or 15b. According to other embodiments, the closing portion 31 may have a different perimetral profile or cross-sectional dimension (i.e., a cross-sectional dimension in a direction radial or orthogonal with respect to the axis of the hole), but in any case a shape inscribed in which is an imaginary circular region of diameter $D_1$ (for example, the portion 31 could have a polygonal shape, inscribed in which is an imaginary cylindrical or disk-shaped portion of diameter $D_1$).

Figure 16:
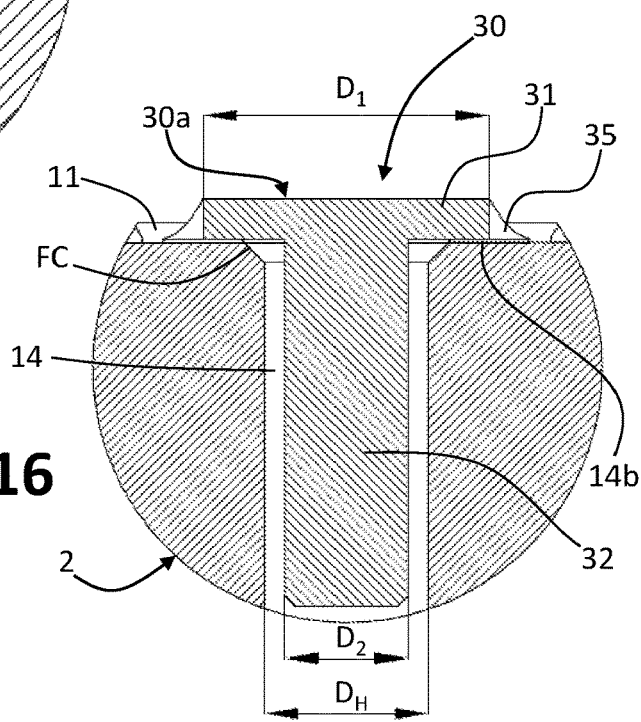

As represented in FIG. 16, the diameter $D_1$ of the closing portion 31 is larger than the diameter $D_H$ of the hole 14 (or 15) provided with the corresponding metallization 14a (or 15a). In this way, the closing portion 31 remains on the outside of the metallized hole 14-14a (or 15-15a), it being able to cover completely the corresponding end opening thereof. The diameter $D_1$ is predefined in the stage of design of the closing portion 31, such as to cover or close completely the corresponding end opening of the metallized hole 14-14a or 15-15a, even in the conditions of different tolerances of size of the device 1 and/or of positioning of the closing member 30 with respect to the corresponding metallized hole that are typical of industrial production of sensors or circuits.

In the case of the embodiment referred to in FIGS. 13-16, the pre-formed body 30*a* of the closing member 30 comprises, in addition to the closing portion 31, also a positioning or centring portion, designated by 32 (hereinafter defined for brevity also simply as "centring portion"), which extends underneath the portion 31. Preferably, the centring portion 32 has a cylindrical or tubular shape having a diameter $D_2$ smaller than the diameter $D_1$, in particular smaller than that of the corresponding metallized hole 14-14*a*, 15-15*a*. According to embodiments not represented, the centring portion 32 may have other shapes suited to the purpose, and in particular a shape designed to be inscribed or contained in a circle of diameter $D_2$ (for example, a polygonal or star shape that can be inscribed in a circle of diameter $D_2$).

In a preferential embodiment, the centring portion 32 has a diameter $D_2$ (FIG. 16) that is smaller than the diameter $D_H$ of the metallized hole: in this way, the centring portion 32 facilitates mounting of the member 30 on the sensor body 2, moreover ensuring correct positioning of the closing portion 31 relative to the metallized hole. For this purpose, in a preferred embodiment of the invention, the diameters of the hole with the corresponding metallization, of the closing portion 31, and of the centring portion 32 are such that, for any centring position that may be assumed by the portion 32 in the metallized hole, the closing portion 31 always obstructs the end opening of the hole. The concept is well exemplified by the comparison between FIGS. 14 and 15, which illustrate a position of the portion 32 perfectly centred in the hole (FIG. 14) and a position completely off centre of the portion 32 in the hole, i.e., up against the conductive layer 14*a* (FIG. 15): as may be noted, also in this position, the portion 31 covers the end opening of the metallized hole 14-14*a* completely.

In general, in an embodiment of the type represented in FIGS. 13-16, where the portion 32 starts from a central area of the underside of the portion 31, half of the difference between the diameter $D_1$ of the closing portion and the diameter $D_2$ of the centring portion is greater than the difference between the diameter $D_H$ of the metallized hole and the diameter $D_2$ of the centring portion 32.

In various embodiments, the positioning or centring portion 32 may also have a shape and size such as to cause an albeit minimal interference with the inner surface of the hole 14 (or 15), i.e., with the corresponding metallization 14*a* (or 15*a*), in particular in order to cause a mutual mechanical fixing, for example in order to keep the closing member 30 temporarily in position, in particular in the steps that precede fixing or soldering of the closing portion 31 to the circuit pattern 7 and/or to the corresponding pad 14*b* or 15*b*. For this purpose, the centring and/or fixing portion 32 could also have a shape that is at least in part conical, or else have two different diameters of which one is designed to provide the aforesaid interference or again presents a surface knurling or is shaped with radial reliefs (for example, with a cross section substantially shaped like a star, with points of the star designed to provide the aforesaid interference with the corresponding metallized hole 14*a*). Of course, for these cases, the shape and/or sectional dimensions of the portion 32 will be chosen so as to cause an interference that will not damage or will not jeopardize operation of the metallization 14*a* or 15*a*, for example a shape that, if need be, is in part deformable.

The closing portion 31 is preferably shaped like a plate, whilst the portion 32—if present—preferably has the shape of a pin or relief projecting from the portion 31. In alternative embodiments, the portion 32 comprises a number of parts in relief, such as three pins arranged in a triangle or a number of pins arranged at the vertices of a polygon that can be inscribed in a circle of diameter $D_2$ or $D_H$.

In the embodiment illustrated by way of example in FIGS. 13-16, the portions 31 and 32 have a circular outer profile, the former being shaped like a small disk and the latter being cylindrical. It will be appreciated, however, that—as has been said—these shapes, albeit preferred, are not strictly essential for the purposes of implementation of the invention, and may be different. The portion 31 could in fact have a peripheral profile that is polygonal, elliptical, etc.; similar considerations apply to the portion 32, if present.

In various embodiments (not represented), the upper side or surface of the portion 31 could have a shape different from the one here represented as plane, for example at least in part curved or prismatic, for instance hemispherical. Also the underside or lower surface of the portion 31 could have a shape different from the one here represented as plane, but in any case such as to perform the function of closing the corresponding metallized hole. For instance, the lower surface of the portion 31 could be in part curved or prismatic, for example recessed. Also for these cases, the lower surface of the portion 31 is preferably provided with a profile designed to mate in a uniform way with the area of the pads 14*b* or 15*b*, such as a plane coupling profile or surface: this also in order to obtain a good fluid-tightness against any infiltration of the fluid into the coupling area, in particular after a corresponding gluing or soldering. The peripheral and/or upper and/or lower surfaces of the portion 31 preferably have a shape designed to enable easy soldering or fixing of the portion 31 to the pads 14*b* or 15*b* and/or a shape designed to enable a further coating of the portion 31 via a coating and/or protective material, such as a resin or a sealant.

In various embodiments, the shape of the portion 31 of the member 30 is such as to provide also an electrical terminal, preferably via a relief that extends from the upper face of the portion 31, for example for soldering and/or fixing of a component of the circuit arrangement (for instance, an electrical terminal of the sensor 8: in this case, the terminal of the sensor 8 may be connected directly to the member 30 instead of to a corresponding pad 12*a* or 12*b*).

Of course, the metallized holes 14-14*a*, 15-15*a* do not necessarily need to have a circular cross section either. The term "diameter" used here is hence to be understood in general, and consequently also as indicating perimetral dimensions or cross-sectional dimensions of the body 30*a* of the closing member 30 that correspond to an area or a perimeter or a cross section of the portions 31 and/or 32 and/or of the corresponding metallized hole.

The pre-formed body 30*a* of the member 30, whether comprising or not the centring portion 32, is preferably made of at least a metal material or a metal alloy, such as copper, or copper alloys, preferably tinned or coated with other metal or alloy, in particular a material designed to facilitate soldering or gluing. Preferably, the pre-formed body 30*a* is made of a single piece, obtained for example via machining operations, such as blanking and/or upsetting and/or turning, or else the member 30 is formed at least in part via stamping, such as deformation using a die or injection of molten metal material into a die.

For instance, in one embodiment, the body 30*a* of the member 30 (even when it comprises only the closing portion 31) is obtained starting from a metal bar appropriately machined via turning, or else from a metal bar shaped via blanking and/or stamping; alternatively, an end portion of a metal bar could be deformed via an upsetting operation to obtain the portion 31. The body 30a of the member 30 may be also obtained via a process of micromelting or stamping of molten metal material.

The closing member 30 and/or at least the portion 31 of its body 30a is preferably made of a material having a hardness and/or a mechanical strength greater than that of the materials commonly used for occluding the metallized holes provided according to the known art, in particular a material having a deformation strength and/or a shear strength greater than those of an alloy for soldering circuits.

Figure 1A:
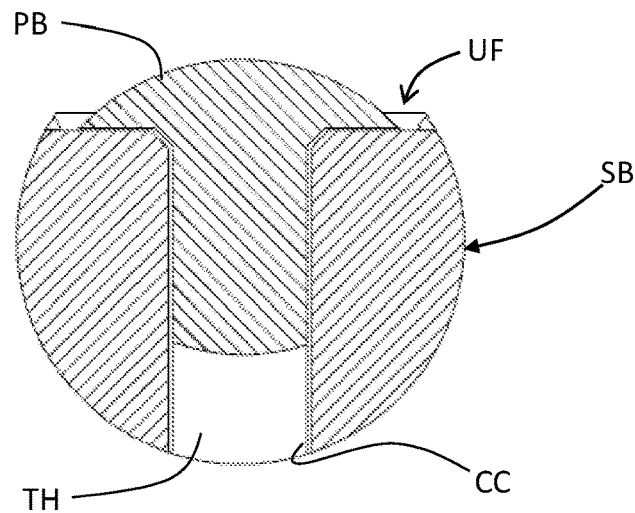
FIGS. 1A, 1B, and 1C are partial and schematic sections aimed at exemplifying a problem inherent in pressure sensors of a known type.
Figure 1B:
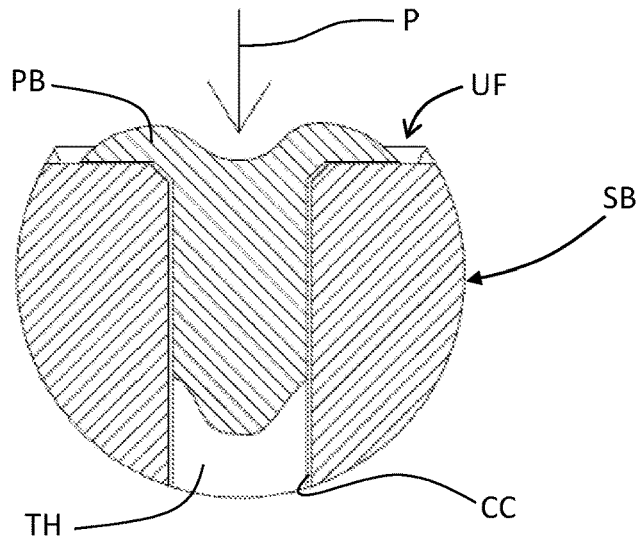
Figure 1C:
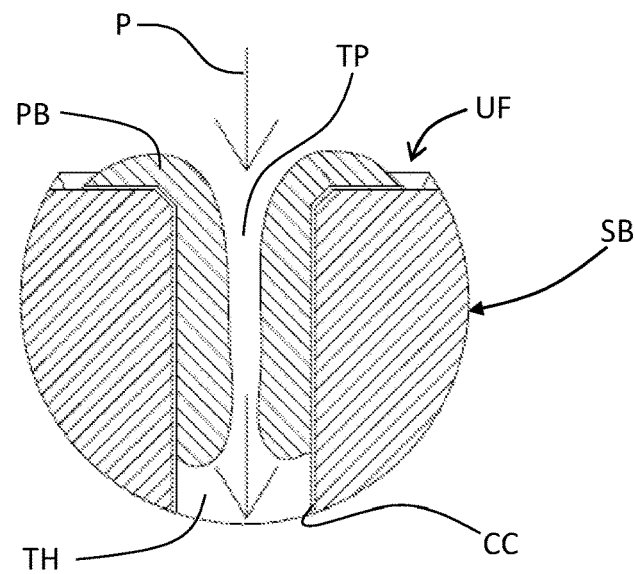

The member 30, and in particular its closing portion 31, enables a sealing or closing of the metallized hole 14 to be obtained that is substantially immune from any deformation or extrusion, which is typical instead of the masses of soldering or closing material used in the traditional technique, as exemplified in FIGS. 1A-1C.

In various embodiments, the shape and/or dimensions of the body 30a or of its portion 31 are preferably defined also taking into account the corresponding material, for example it being possible to define a diameter and/or a thickness of the portion 31 that is all the smaller (obviously compatibly with the diameter of the metallized holes), the higher the mechanical strength of the material used. In various embodiments, the annular area of resting of the portion 31 of the member 30 on the pad 14b or 15b may be defined beforehand so that it will be possible to withstand the thrust loads due to the pressure of the fluid. In the case of the example of FIG. 16, the aforesaid annular area substantially corresponds to the circular area defined by the diameter $D_1$ minus the circular area defined by the diameter $D_H$ of the circular hole, not considering the area defined by a possible chamfer.

In various embodiments, the thickness and shape of the portion 31 of the member 30 may be determined in such a way as to define a substantially annular area capable of withstanding the force or pressure of the fluid, in particular a pressure of some hundreds of bar and/or a force in a direction substantially parallel to the axis of the metallized hole 14, 15, such as a force of some kilograms, for example a pressure comprised between 1 kg/mm$^2$ and 4 kg/mm$^2$ The aforesaid substantially annular area of resting of the portion 31 is preferably greater than the area corresponding to the metallized hole 14-14a, 15-15a, in particular a value of surface corresponding to at least twice the area that corresponds to the metallized hole 14-14a, 15-15a.

Merely by way of example, the portion 31 may have a thickness comprised between approximately 0.15 and 0.3 mm, preferably approximately 0.2 mm. With a metallized hole having an internal diameter of between approximately 0.6 and approximately 1 mm, preferably 0.8 mm, the portion 31 may have a diameter $D_1$ of between approximately 1 mm and approximately 1.6 mm, preferably 1.4 mm, whereas the portion 32—if present—may have a diameter $D_2$ of between approximately 0.59 mm and approximately 0.99 mm, preferably 0.6 mm.

In a preferred embodiment, the end of the metallized hole where a closing member 30 is to be mounted, provided with centring portion 32 is shaped so as to define a lead-in portion or a flaring, for example a chamfered profile or a profile inclined with respect to the axis of the hole in order to facilitate insertion of the portion 32 into the hole. For this purpose, in the embodiment provided by way of example represented in FIGS. 13-16, the end of the hole 14 includes a substantially frustoconical stretch, designated by FC only in FIGS. 14-16, with the corresponding conductive layer 14a or 15a that has a corresponding shape in this region. Preferably, the lower end of the portion 32 is shaped so as to favour insertion of the portion itself in the metallized hole; in the case exemplified, this lower end has a profile or a chamfered, or inclined, or rounded peripheral edge, designated by 32a only in FIG. 13, but other shapes suitable for the purpose are obviously possible, such as a generally pointed or hemispherical shape or a frustoconical shape that is more marked as compared to the case illustrated.

According to a further inventive characteristic, at least one portion of the pre-formed body 30a of the member 30, preferably its closing portion 31, is fixed in a fluid-tight way to the corresponding metallized hole. Preferably, the aforesaid portion 31 is fixed in position via at least one of a fixing material and a sealing material, for example a soldering material, a gluing material, or a resin. In various embodiments, a first material may be provided for local fixing in position and/or for obtaining a first seal of the portion 31, and a second material may be provided for guaranteeing or improving the necessary fluid-tightness of the portion 31 with respect to the corresponding metallized hole. In an embodiment of this type, for example, the first fixing and/or sealing material may be a soldering or gluing material, whereas the second sealing material may be a soldering material, or a resin, or a polymer. In various other preferred embodiments, instead, a single material is provided, which performs simultaneously functions of fixing in position and functions of tightness, such as a soldering material (for example, a metal alloy), or a gluing material, or a resin, or a polymer. In the figures, such a material, which simultaneously performs fixing and sealing functions, is designated by 35.

In a preferred embodiment, the material 35 is set at least on the end face of the sensor so as to surround the closing portion 31 of the member 30 peripherally in order to ensure fluid-tightness between this face and the peripheral surface of the portion 31. The material 35 used presents characteristics such as to fix the member 30 in position, in addition to guaranteeing the necessary fluid-tightness. For this purpose, preferably, the material 35 is a material or a metal designed to weld or bond chemically and/or structurally to the material of the portion 31 and to the material of the corresponding pad 14b or 15b. Of course, the material 35 may also be deposited so as to extend at least in part over the upper surface of the portion 31 and/or coat this portion completely, possibly extending at least in part between its lower surface and the corresponding pad 14b or 15b.

In a preferred embodiment, the fixing and/or sealing material is a weld material or an added material, with the body 30a of the member 30 that is fixed in position in a fluid-tight way via soldering or sealing or gluing.

In a different embodiment, the fixing and/or sealing material is a material that provides or coats at least in part one of the closing member 30 and the circuit pattern 7 and pads 14b, 15b, with the portion 31 of the member 30 that is fixed in position in a fluid-tight way via soldering. For instance, the body 30a of the member 30 and/or the pads 14b, 15b may be initially coated with a soldering material (for example, they may be pre-tinned), this material being is then re-melted to bring about sealing and/or fixing, and hence without any need for a further addition of solder alloy. In addition or as an alternative, such a material designed to remelt may be provided within a metallized hole, the material coating the corresponding metallization at least in the part of hole that is to receive a portion of the pre-formed body, for example the portion 32. The material designed to remelt may also comprise a surface layer of part of the pre-formed body or of the metallization of the hole.

Preferably, the end pad 14b or 15b where the member 30 is located has a diameter larger than the diameter of the closing portion 31. Preferably, the diameter of the portion 31 of the member 30 and the diameter of the pad 14b or 15b in question are such that, for any position of centring of the former with respect to the latter, a peripheral annular part of the pad projects laterally from the closing portion 31. Also this concept emerges from the comparison between FIGS. 14 and 15.

In this way, as may be appreciated, the side or the lower surface of the portion 31 rests on the pad 14a (or 15a), with the aforesaid peripheral part of the latter that in any case projects laterally. In an implementation of this sort, the fixing and/or sealing material, such as the material 35, in particular a weld or added material, may be a material used for fixing or soldering together at least the aforesaid peripheral part of the pad in question and the lateral surface of the closing portion 31 of the member 30, as exemplified for instance in FIGS. 14-16.

The material 35, in the case of soldering, is preferably a metal material or a metal alloy, for example with a base of indium, and/or tin, and/or lead. In possible variant embodiments, on the other hand, the material 35 is a solder paste or a glue designed to ensure positioning and fluid-tightness at high pressures, preferably pressures of up to at least 400 bar.

Figure 10:
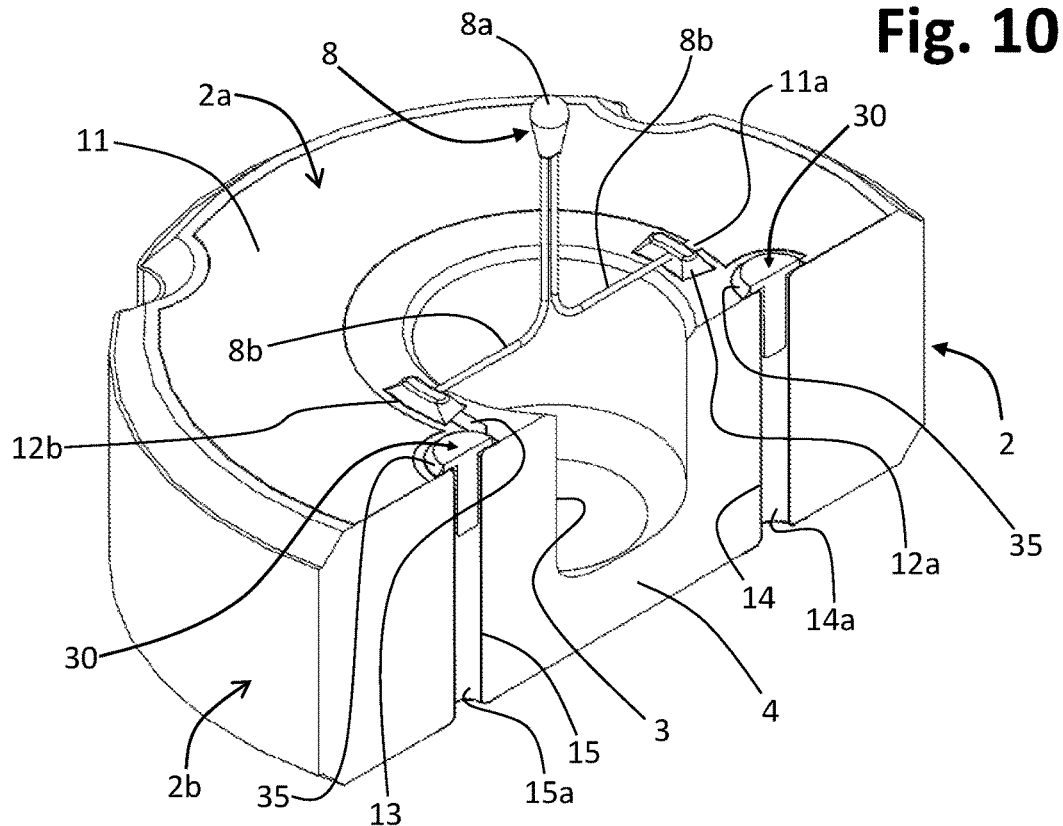
FIG. 10 is a schematic, sectioned, perspective view, of a pressure sensor according to an embodiment of the invention, with a corresponding protective layer removed.
Figure 11:
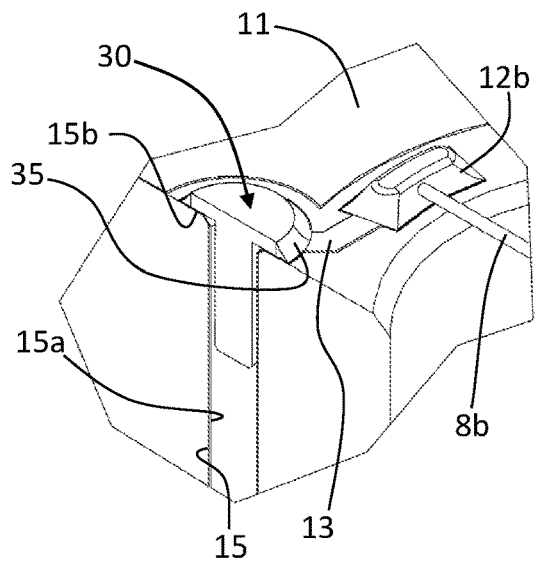
FIGS. 11 and 12 are details of some elements of the pressure sensor of FIG. 10.
Figure 12:
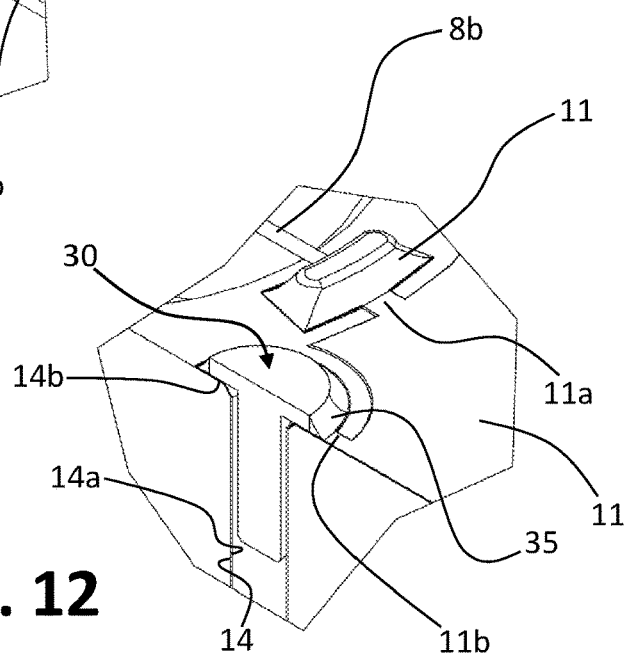
Figure 13:
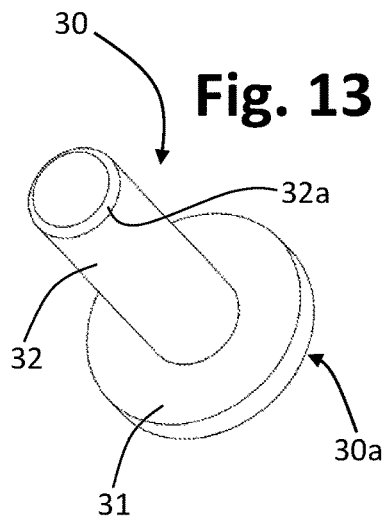
FIG. 13 is a schematic perspective view of a closing member that can be used in a pressure sensor according to an embodiment of the invention.
Figure 14:
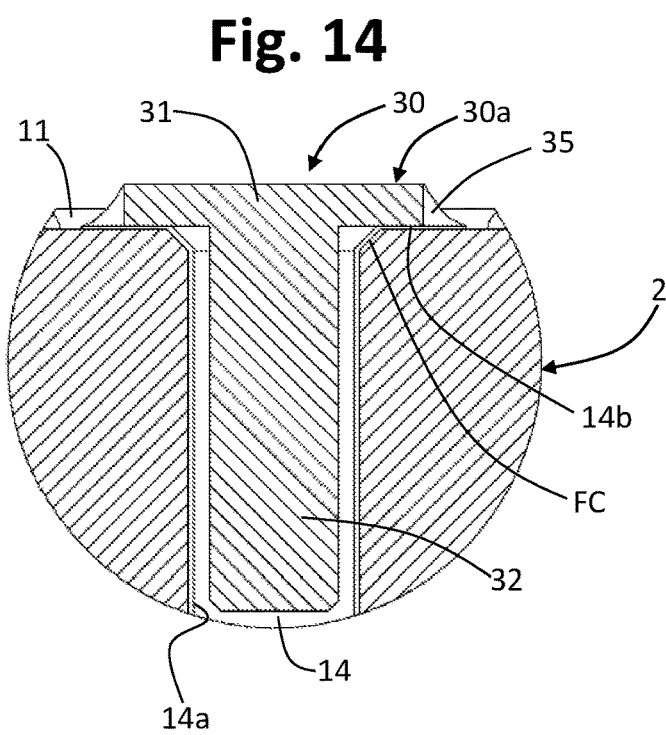
FIGS. 14, 15, and 16 are partial and enlarged schematic sectional views of a pressure sensor according to an embodiment of the invention, equipped with a closing member according to FIG. 13.
Figure 15:
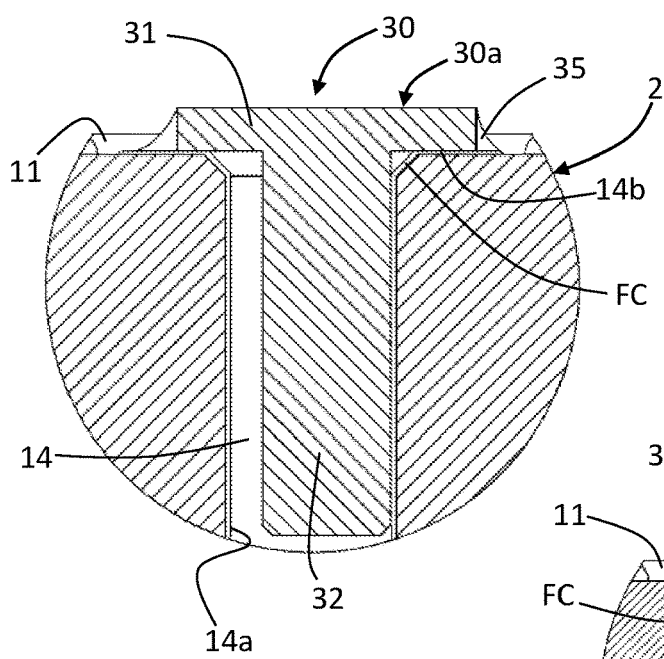

The arrangement of the closing members 30 according to FIGS. 13-16 at the lower ends of the metallized holes 14-14a and 15-15a is clearly visible also in FIG. 10 and in the details represented in FIGS. 11 and 12, where also the portions 11a and 13 of track for connection of the pads 12a, 12b are clearly visible.

Figure 17:
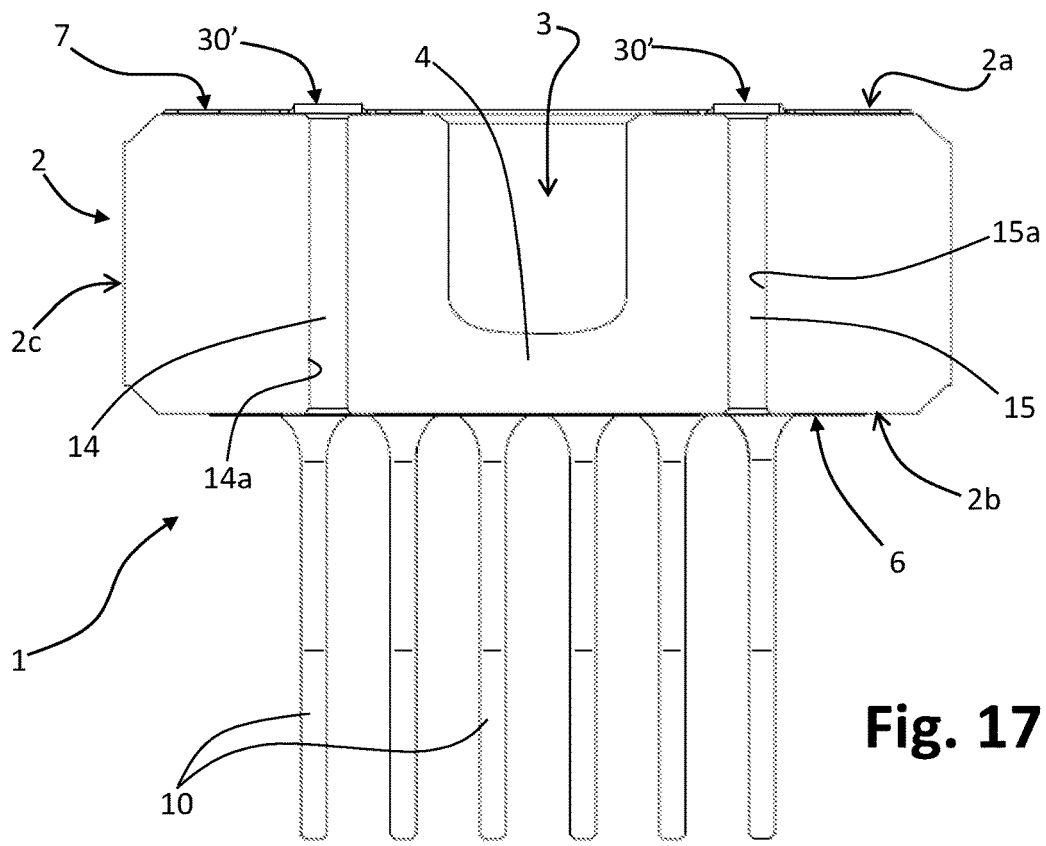
FIG. 17 is a schematic cross-sectional view similar to that of FIG. 5, corresponding to a pressure sensor according to a different embodiment of the invention.
Figure 18:
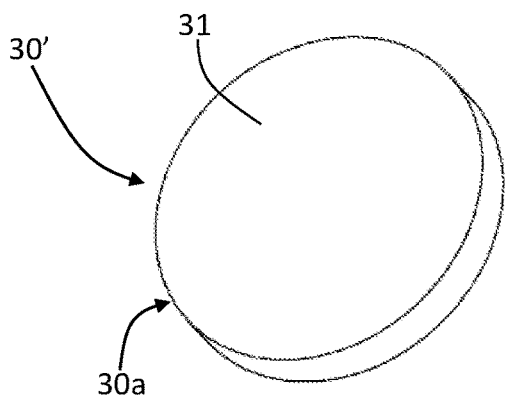
FIG. 18 is a schematic perspective view of a different embodiment of a closing member that can be used in the pressure sensor of FIG. 17.
Figure 19:
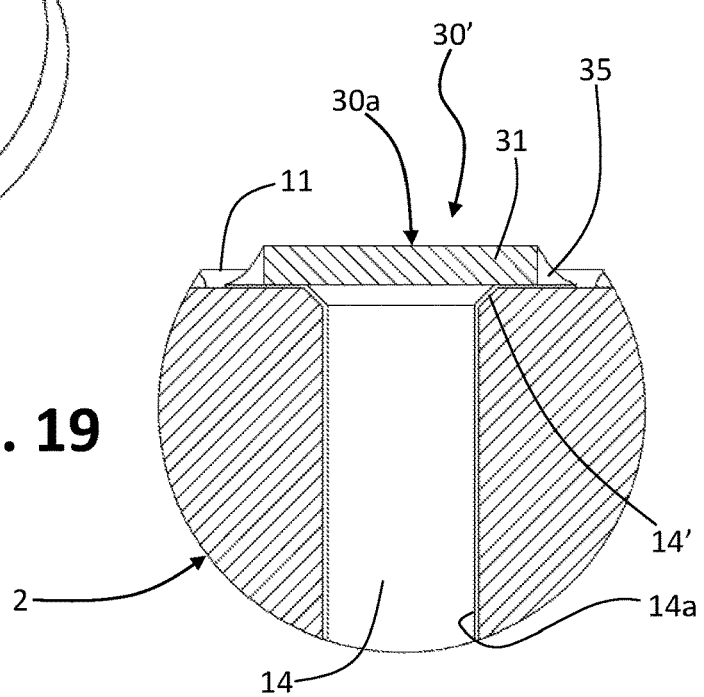
FIG. 19 is a schematic cross-sectional view similar to that of FIG. 14, corresponding to an enlarged detail of a pressure sensor according to FIG. 17.

FIGS. 17-19 illustrate an embodiment according to which the pre-formed body 30a of the closing members, here designated by 30', consists only of the closing portion 31, here exemplified in the form of a disk-shaped plate, which may be made and/or fixed according to what is described in reference to the previous example of FIGS. 13-16. This type of implementation presupposes a higher operating precision in positioning of the member 30 at the end of the corresponding metallized hole, given the absence of a centring portion, but presents the advantage of simplifying the formation of the member itself, which, for example, may be obtained via blanking from a metal strap. This solution enables also saving of material for production of the pre-formed body.

For the rest, also in this case the members 30' fixed in position via the corresponding material 35 ensure closing in a fluid-tight way of the metallized holes, without any risk of deformation and/or extrusion with consequent passage of the fluid, as described in the introductory part of the present disclosure.

In preferred embodiments of the invention, the pre-formed body 30a of the closing member extends on the outside of the corresponding metallized hole, as in the case of the member 30', or else extends only partially into the corresponding hole, for a limited stretch of the length of the hole itself, as in the case of the member 30. In this way, any risk of anomalous electrical contacts or even failure of the closing member following upon thermal expansion are prevented. From practical tests conducted by the present Applicant, the latter has noted that these problems may arise in the case of closing members aimed also at replacing the surface metallization of the through holes, i.e., members that extend completely between the two faces of the sensor body until they come out of the two ends of the hole, for example members substantially in the form of rivets or metal terminals mechanically upset at their two opposite ends, outside the hole. In these cases, there may occasionally occur expansion of such a member, which is greater than that of the sensor body. This causes mechanical stresses on the member, at the opposite end of the hole, which may give rise to false contacts with the corresponding track of the circuit pattern on account of the fact that the head of the rivet or the upset end of the terminal tends to rise with respect to the corresponding face of the sensor body. For the same reasons, there may arise also occasional failure of the conductive tracks or of the pads, if the ends of the rivet or of the terminal are soldered to the tracks or pads themselves.

The above problems are prevented in the preferred case of closing members 30' external to the hole or of closing members 30 that extend only partially into the metallized hole, for a limited part of its length. In these embodiments, the closing member is fixed in position at just one end of the hole; i.e., it is not fixed at the other end of the same hole, thereby preventing mechanical stresses that could be the cause of cracks or failure following upon thermal expansion.

In various embodiments, the closing members 30 and/or 30' may have a shape and/or dimensions such as to enable easy handling thereof for them to be picked up, and/or moved, and/or positioned for their installation on the pressure sensor 1. For instance, a shape and size may be chosen to enable handling of a member 30 or 30' using a small suction pad or a suction device or vacuum device, such as a device for manual pick-up or a device belonging to an automatic assembly system. For this purpose, for example, an automated system may be used of the type employed for handling and mounting SMD components, such as a system of the pick-and-place (P&P) type, which in particular is designed to pick up the closing member 30 or 30' via suction or vacuum.

For this purpose, the upper part of the portion 31 of the body 30a may be provided with a surface designed for the P&P system, such as a smooth surface or a surface finished in such a way as to enable tightness when suction is exerted by a small suction pad or when vacuum is brought about. In order to facilitate picking-up, the closing members 30 or 30' may be pre-arranged in purposely provided containers or on strips, in particular in a position such as to expose the aforesaid upper surface of the portion 31.

As mentioned previously, the circuit pattern 7 is practically entirely coated with a protective layer L2 of electrically insulating material, in particular a vitreous or polymeric material, applied on the face 2a of the body 2. In a preferred embodiment, as may be appreciated, for example, in FIGS. 2 and 20, the protective layer L2 has passages or openings (not represented) so as to leave exposed the connection pads 12a and 12b of the sensor 8, as well as passages or openings so as to leave exposed the pads 14b, 15b and the head of the closing members 30, with the corresponding fixing and/or sealing material, for example the material 35, that performs both of functions. Such a measure enables, for example, mounting and connection of the sensor 8, as well as mounting and fixing in a fluid-tight way of the members 30, even after arrangement of the layer L2. On the other hand, in different embodiments, the layer L2 could be provided following upon mounting of the sensor 8 and/or of the members 30, also so to coat at least partially the pads 12a, 12b and/or the pads 14b, 15b, and/or the portion 31 of the members 30 or 30' with the corresponding material 35.

In a variant embodiment of this type, it is also possible to omit the material 35, the sealing functions of which can be performed directly by material of the protective layer L2. As already mentioned, in a case of this type other means may be provided to obtain fixing in position of the closing member 30 or 30', such as soldering of the closing portion 31 on the pads 14b or 15b, or else the aforesaid insertion with slight interference of the centring portion 32 in the corresponding metallized hole.

Figure 20:
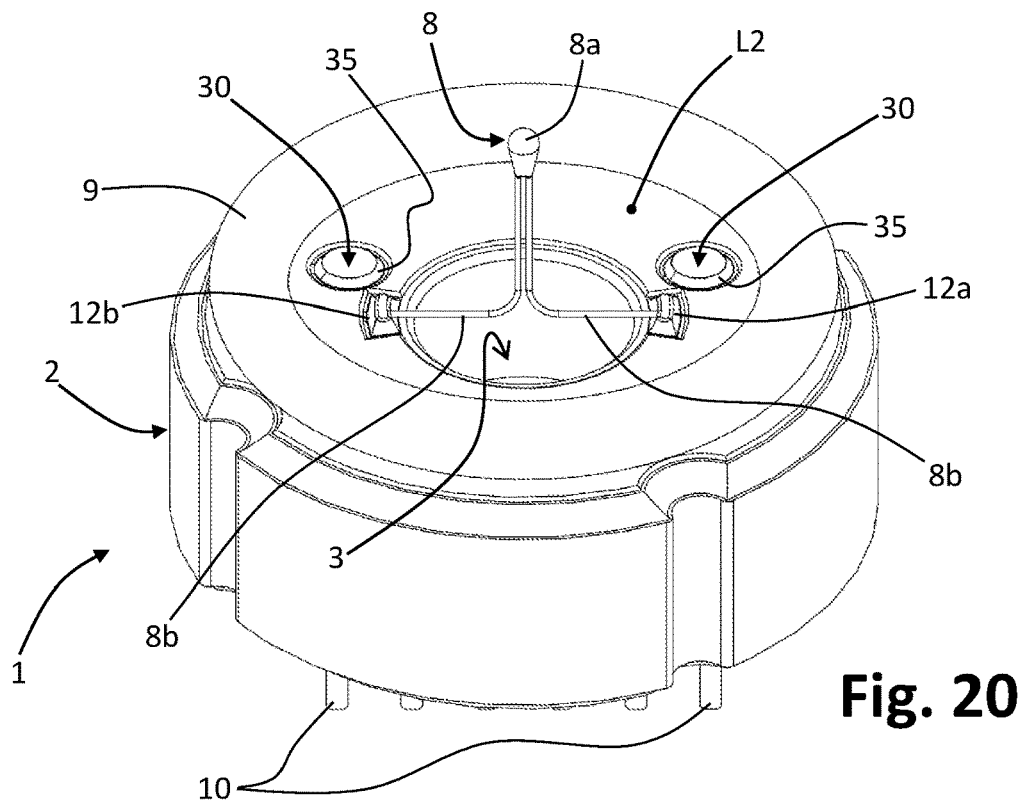
FIG. 20 is a schematic perspective view of a pressure sensor according to an embodiment of the invention, with a corresponding seal element.

In the embodiment exemplified in FIGS. 2 and 20, the layer L2 is deposited—for example via silk-screen printing—in way such that at least an annular part of its upper surface is as a whole substantially plane in order to provide a resting surface for the annular seal 9. In a preferred embodiment of this type, the circuit pattern 7 comprises an annular track 11, so that such an annular track or the part of the layer L2 that covers it will enable simple definition of a uniformly plane resting base for the seal 9.

Figure 22:
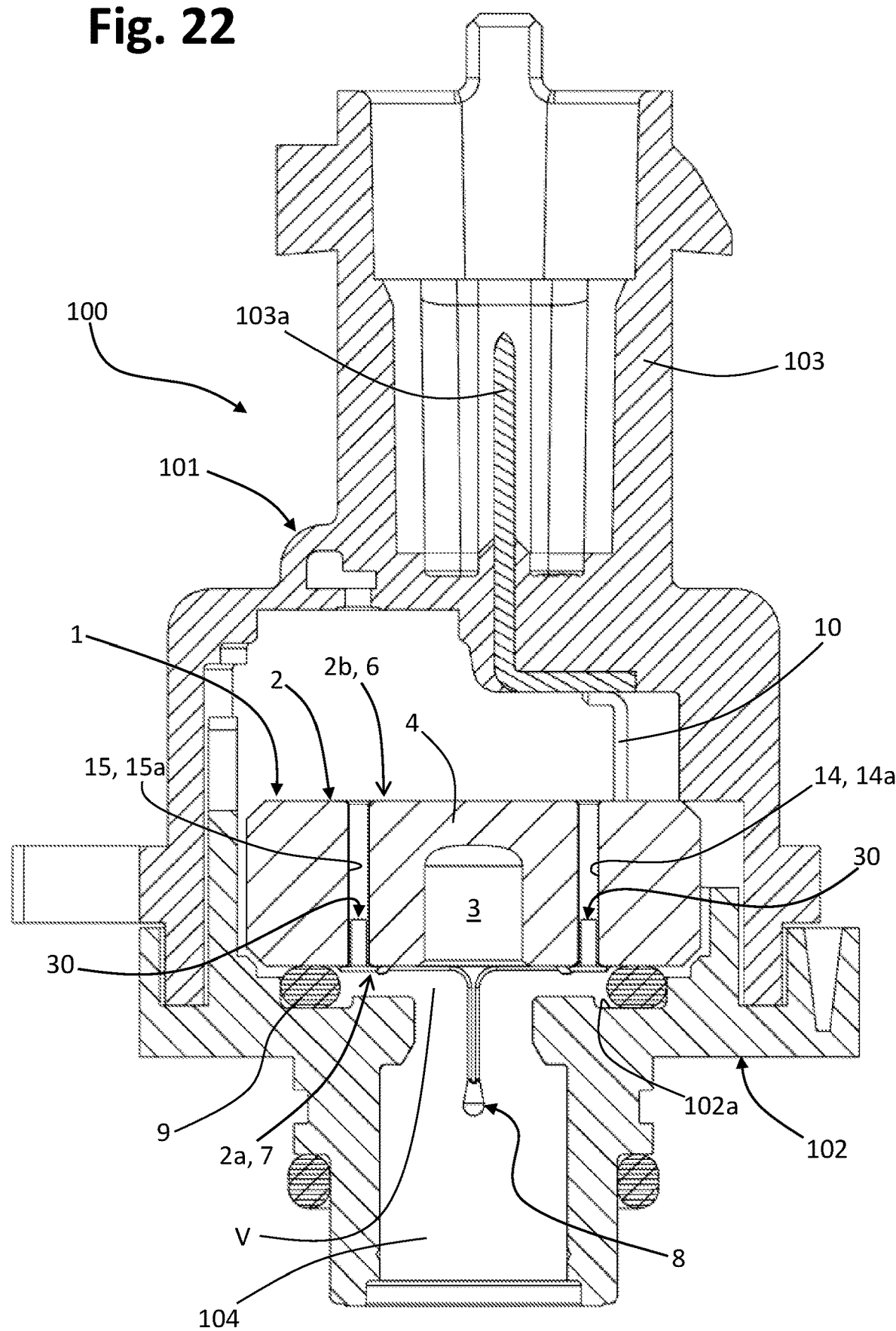
FIG. 22 is a schematic cross-sectional view of the device of FIG. 21.

It should be noted in any case that the diameter of the track 11 could even be smaller than the diameter of the seal 9, in which case the latter can rest on the lower face 2b of the sensor body 2, possibly also in an peripheral area thereof not presenting parts of the circuit arrangement or a protective layer L2 (in a way similar to what is illustrated in FIG. 22).

As may be noted in FIG. 20, in the case exemplified, both the pads 12a and 12b and the members 30 that close the upper ends of the metallized holes are located within the region circumscribed by the seal 9, thereby being exposed to the fluid. Provision of a member 30 with the corresponding sealing and fixing material enables solution of the problems highlighted in the introductory part of the present description.

Figure 21:
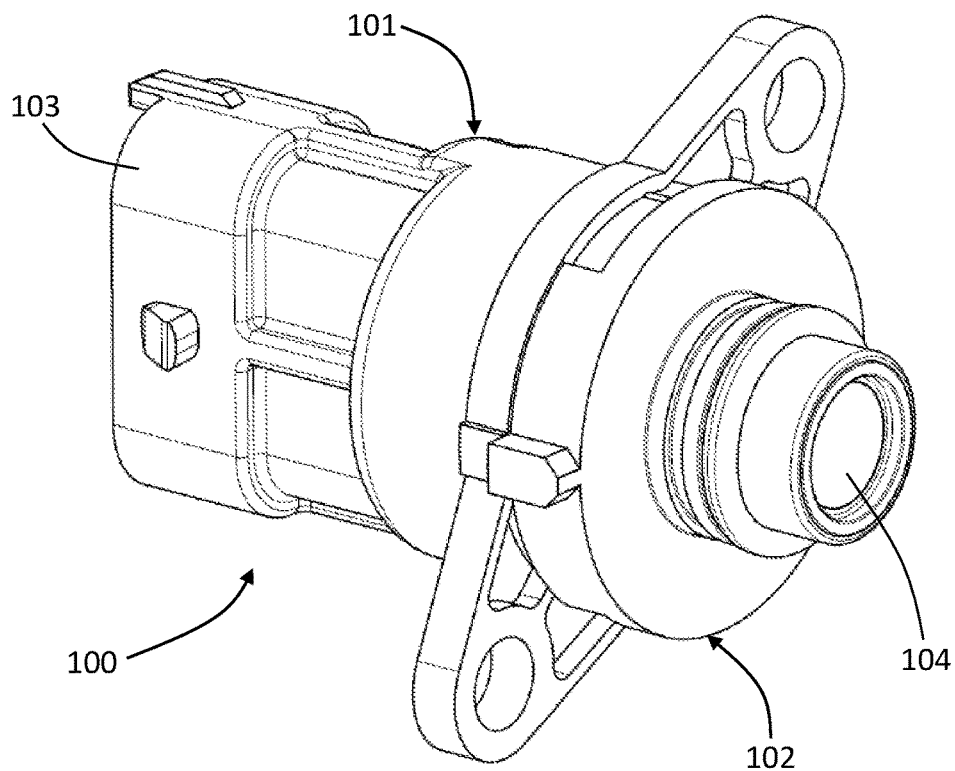
FIG. 21 is a schematic perspective view of a sensing device using a pressure sensor according to the invention.

FIGS. 21 and 22 are schematic illustrations of an example of device for detecting the pressure of fluids that integrates a pressure sensor according to one of the embodiments described previously, and namely a sensor 1, preferably but not necessarily with a protective layer L2 of the type described with reference to FIGS. 2 and 20. Such a device, designated as a whole by 100, may find use, for example, in the automotive sector, or in the domestic sector and the sector of electrical household appliances, or in the HVAC, plumbing, and sanitary sector.

With reference to FIG. 21, the device 100 has a casing body, formed for example by at least two body components 101, 102, coupled in a fluid-tight way so as to define between them a housing for the sensor 1. In the case exemplified, the component 101 defines a tubular part 103 of an electrical connector, whereas the component 102 defines an inlet 104, designed to be connected to a circuit, located in which is the fluid of which the pressure and temperature are to be detected (assuming—as in the case considered here—that the component 8 is a temperature sensor).

Visible in FIG. 22 is the housing defined between the two components 101, 102, within which the sensor 1 is fixed with modalities in themselves known. From the figure it may moreover be noted how extending within the tubular part 103 of the component 101 are connection terminals 103a, with which the terminals 10 of the pressure sensor 1 are electrically in contact. The pressure sensor 1 is mounted within the casing body 101-102 so that its lower face—located in which is the opening of the cavity 3—faces the inlet 104, within which the temperature sensor 8 preferably projects. Mounted between an upper face of the component 102 and the pressure sensor 1 is the seal 9. Preferably, the aforesaid upper face of the component 102 is purposely provided with a positioning seat 102a for the seal 9, which rests on the opposite side on the lower face of the sensor, as explained previously.

As may be noted, with the arrangement illustrated, the seal 9 delimits peripherally a chamber or a volume V, within which the closing members 30 of the metallized holes are located.

General operation of the device 20 and of the pressure sensor 1 occurs according to known modalities, and consequently will not be described in detail here. As may be appreciated, the fluid at inlet from the passage 104 can reach the cavity 3 of the sensor body 2, causing a bending thereof proportional to the pressure, which is measured via the corresponding sensing means R. The fluid, of course, also impinges upon the sensor 8, enabling detection of the further quantity of interest, here represented by the temperature of the fluid. Also in the case of high pressures at the inlet 104, the presence of the closing members 30 prevents any possible leakage of the fluid being detected through the metallized holes 14-14a and 15-15a, as explained previously.

The invention has so far been described with reference to the structure of a pressure sensor of the first type referred to in the introductory part of the present description. It will be appreciated, however, that the invention may likewise be applied also to pressure sensors of the second or third types referred to previously. Such a case is, for instance, exemplified in FIG. 23, where the same references as those of the previous figures are used to designate elements that are technically equivalent to the ones already described above.

Figure 23:
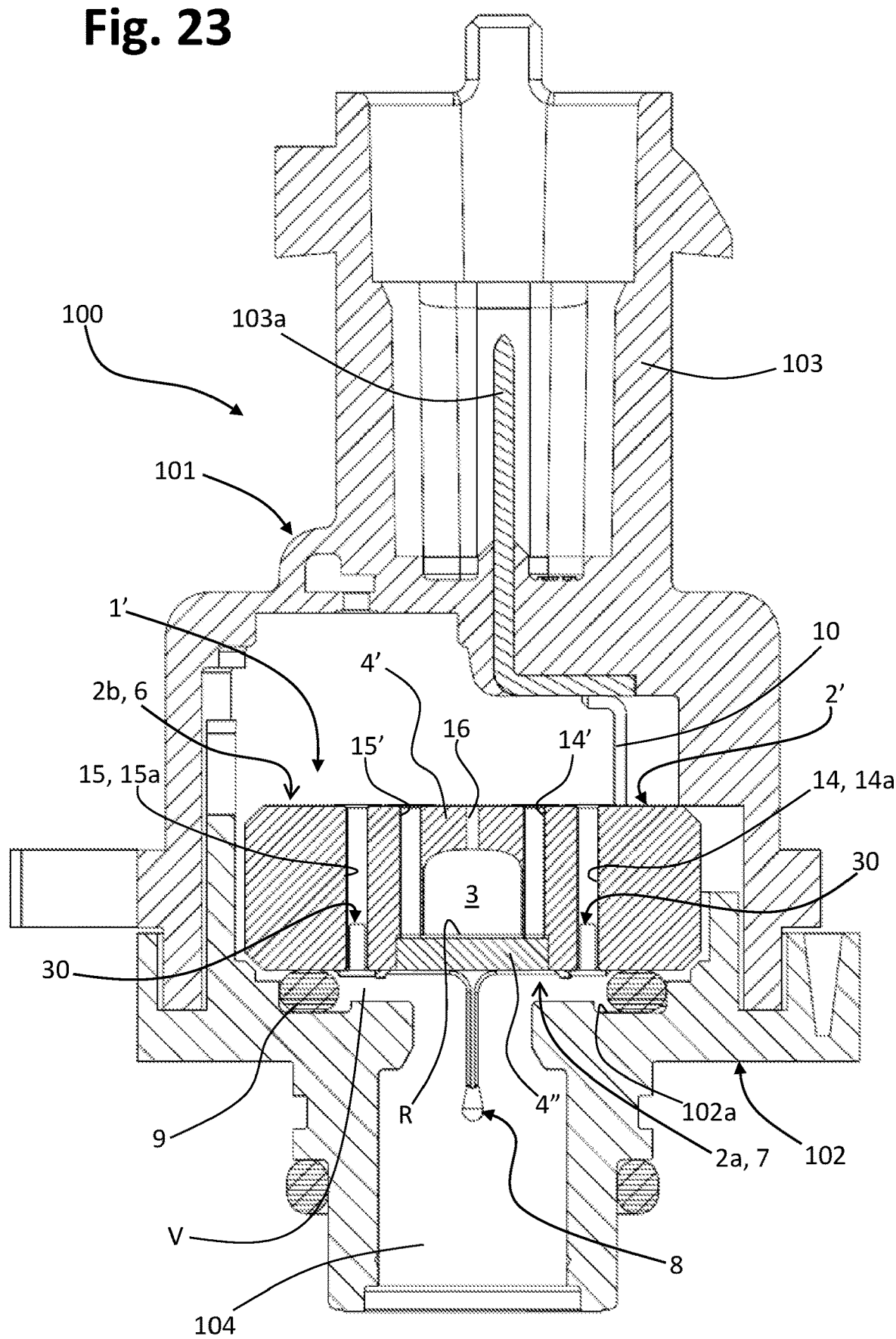
FIG. 23 is a schematic cross-sectional view similar to that of FIG. 22, but corresponding to a further embodiment of the invention.

In the case of the device of FIG. 23, the sensor—here designated as a whole by 1'—has a body made up of at least two distinct parts, comprising a first main body part 2', defining the corresponding axial cavity 3, which is closed in at the face 2b, in particular by a corresponding portion 4', which here does not perform the membrane function. The sensor body then comprises a membrane part 4", fixed in a fluid-tight way to the body part 2', in a known way, at the opposite end of the cavity 3, i.e., at the face 2a. In the non-limiting example, the face 2a is provided with a recess (not shown), which is substantially coaxial to the cavity 3, within which the membrane 4' is fixed, the recess and membrane preferably having a similar peripheral profile. In other embodiments (not represented), the aforesaid recess may be absent.

The side of the membrane 4" external to the cavity 3 is exposed to the fluid of which the pressure is to be detected, whereas its opposite side, facing the inside of the cavity 3, carries at least one circuit component R for detecting bending or deformation of the membrane 4". The at least one component R may comprise, for example, a plurality of piezoelectric, piezo-resistive, or resistive elements, or else a respective part of a capacitive detector, the other part of which is associated to the main body 2', for example according to techniques in themselves known.

In the embodiment exemplified, the at least one component R is connected to the circuit pattern 6 provided on the face 2a via metallized holes 14' and 15', which are made in a way similar to the holes 14-14a and 15-15a. It should be noted that, in this case, the holes 14' and 15' do not require respective closing members of the type designated by 30 or 30', given that the lower end thereof is in any case in a protected position, thanks to the presence of the membrane 4". The circuit pattern 6 is substantially of the type already described and illustrated previously, obviously modified with tracks and/or pads necessary for connection of the metallized holes 14' and 15'.

In one embodiment, such as the one exemplified in FIG. 23, there is further provided the sensor 8, for example a temperature sensor, mounted at the face 2a and electrically connected to the circuit pattern 6 via the circuit pattern 7 and the metallized holes 14-14a and 15-15a. The circuit pattern 7 is similar or substantially similar to what has already been described previously, for example with at least one corresponding track of electrically conductive material, in particular an annular track, which is located on a region of the face 2a that at least partially surrounds the membrane 4". Also the metallized holes 14-14a and 15-15a are made in a way similar or substantially similar to what has already been described, with the corresponding closing members 30 (or possibly 30').

In the case exemplified, the sensor 1' is of the third type described in the introductory part of the present disclosure; i.e., the sensor body 2', 4" has a passage for setting the inside of the cavity 3 in communication with the outside. In the example, such a passage—designated by 16—is configured as a through hole of the portion 4' of the body 2', thus giving rise to a pressure sensor of the type generically known as "relative pressure sensor". It will be appreciated, on the other hand, that in variant embodiments the passage 16 may be omitted or else sealed in the production stage, in which case the sensor 1' will be of the second type referred to in the introductory part, thus giving rise to a pressure sensor of the type generically known as "absolute pressure sensor", i.e., one presenting a known reference pressure within the hermetically closed cavity 3. For the rest, the structure of the device 100 illustrated in FIG. 23—including the arrangement of the annular seal element 9—is substantially the same as the structure of the similar device of FIG. 22.

As may be appreciated, in the case of FIG. 23, the fluid at inlet from the passage 104 can impinge upon the exposed side of the membrane 4", causing a bending thereof proportional to the pressure, which is measured via the corresponding sensing means R. The fluid also impinges upon the sensor 8, enabling detection of the further quantity of interest, here represented by the temperature of the fluid.

From the foregoing description, the characteristics of the present invention emerge clearly, as likewise do its advantages, which are principally represented by the simplicity, economy, and reliability of the proposed solution. Use of the members 30 or 30', with the corresponding fixing and sealing means (such as the material 35 or the material of the coating L2 or the combination with a first, fixing, material and a second, sealing, material or a mechanical interference between the member 30 and the corresponding metallized hole, or combinations of these means) enables elimination of the problems described with reference to FIGS. 1A-1B, guaranteeing a high reliability of the sensor also in the long term. Practical tests conducted by the present applicant, with pressures of the fluid that is to be measured of up to 400 bar and with sizing of the metallized holes and of the closing members as exemplified previously, have made it possible to ascertain the effectiveness of the solution proposed.

It is clear that numerous variants to the pressure sensor described herein by way of example are possible for the person skilled in the branch, without thereby departing from the scope of the invention as defined in the annexed claims.

The electrically conductive track referred to in FIGS. 6 and 7, with the associated pads and/or the protective layers L1, L2 can be obtained on the sensor body 2 with techniques other than silk-screen printing, even though this is the preferred technique; for example, alternative techniques in this sense may be selected from among lithography, photolithography, spraying or a jet of conductive material, surface metallization, plating, etc.

In possible variant embodiments, the sensor forming the subject of the invention may be equipped with a plurality of additional components of the type previously designated by 8, such as resistors or sensors, for example with electrical connection in parallel or else via a connection to further pads and tracks of the type exemplified.

The structure of the circuit pattern 7 could be of the type described in WO 2014/097255, i.e., configured for enabling connection of alternative components and/or connection according to a number of alternative modalities of one and the same component.

With circuit configurations different from the ones exemplified, the circuit pattern 7 could comprise a number of concentric conductive tracks or, instead of a single tracks 11, a plurality of tracks could be provided forming an arc of circumference. The metallized holes could even number more than two, according to the circuit needs, at least one of which having an end located in an area that can be reached by the fluid, and hence provided with the corresponding closing member 30.

Figure 24:
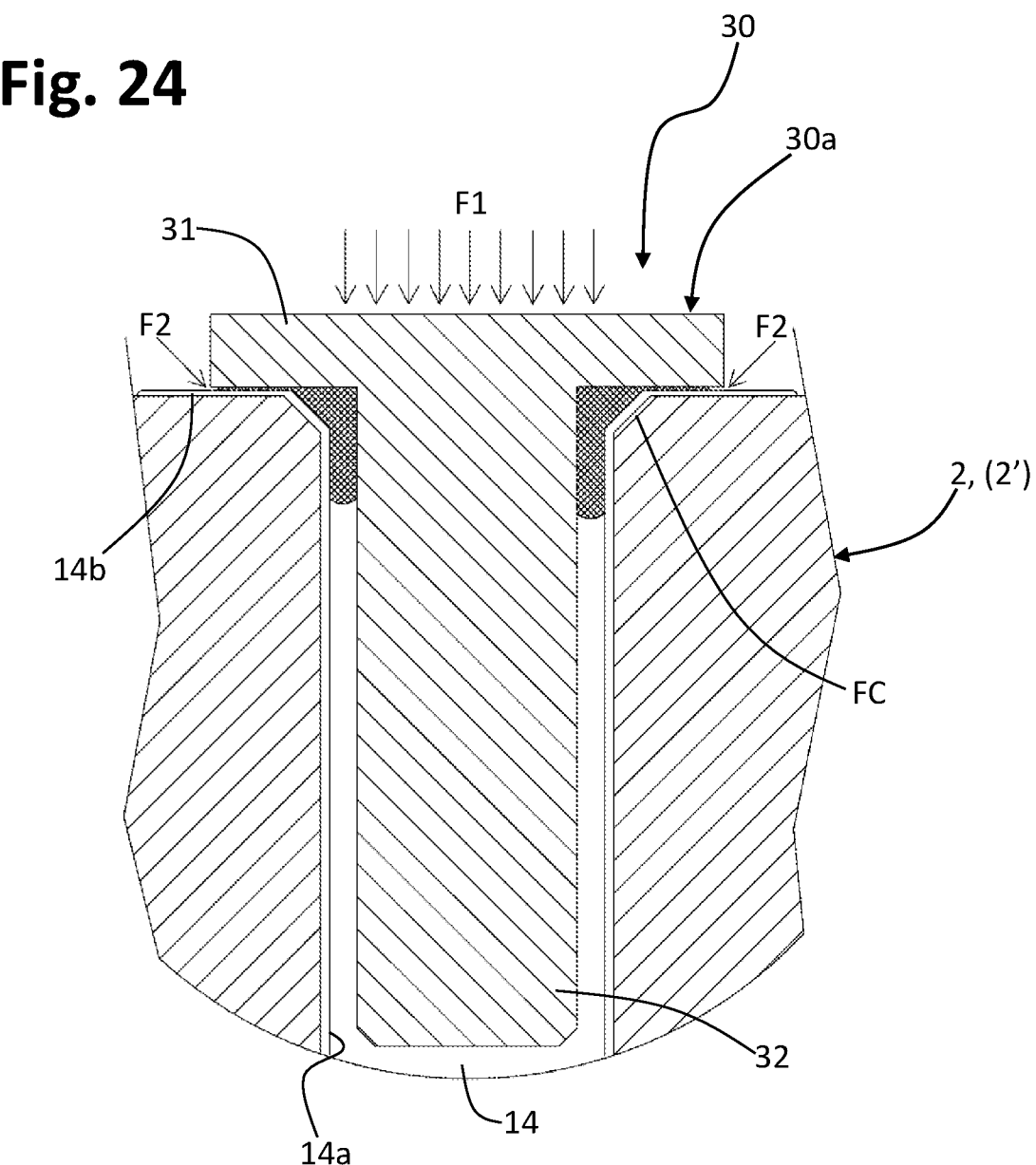
FIG. 24 is a partial and schematic cross section similar to that of FIG. 14, corresponding to a further embodiment of the invention.

Not excluded from the scope of the invention is the case of use of at least one of a fixing and/or sealing material that extends between the lower surface of the portion 31 and the corresponding pad 14b or 15b, and possibly between part of the outer surface of the portion 32 and a corresponding part of the surface of the corresponding metallized hole. Such a case is exemplified schematically in FIG. 24, where the same reference numbers as those of the previous figures are used to designate elements that are technically equivalent to the ones already described, amongst which a fixing and/or sealing material 35. In FIG. 24 the arrows F1 are aimed at representing schematically the pressure of the fluid impinging upon the closing portion 31 of the member 30.

The fixing and/or sealing material 35 between the lower surface of the portion 31 and the corresponding pad 14b (or 15b) has in any case a reduced thickness, in particular such as a thin layer or film. In embodiments of this type, the area of the material 35 possibly subjected to the pressure of the fluid on its outer profile (this pressure is represented schematically by the arrows F2) substantially corresponds to the aforesaid reduced thickness of the material 35. The material 35 is thus able to withstand high mechanical stresses, or forces, or pressures F2 of the fluid, even though the material itself has a hardness or strength lower than that of the closing member 30. Similar considerations also apply in the case where the layer of fixing and/or sealing material that extends underneath the portion 31 of the member 30 belongs to a mass of the same material that also surrounds the portion 31 peripherally and/or coats it at least in part.

The invention claimed is:

1. A pressure sensor, comprising a sensor body made at least in part of electrically insulating material, having a first end face and a second end face opposite to one another, the sensor further comprising a circuit arrangement supported at least in part by the sensor body and including:
    a first electrical circuit pattern, comprising a plurality of respective electrically conductive tracks on the first end face;
    at least one circuit component for detecting a pressure of a fluid;
    a second electrical circuit pattern on the second end face;
    connection elements which electrically connect the first electrical circuit pattern to the second electrical circuit pattern, comprising at least one through hole which extends axially between the first and second end faces of the sensor body, wherein on an internal surface of the at least one through hole a layer of electrically conductive material extends, ends of said layer being electrically connected to the first and second electrical circuit patterns; and a plurality of electrical terminals or contacts, for connection of the circuit arrangement to an external system, the terminals or contacts being electrically connected to at least one of the first electrical circuit pattern and the second electrical circuit pattern, wherein the at least one through hole is closed at an opening thereof, at the second end face of the sensor body, by means of a closing member having a body that is at least in part pre-formed, wherein the pre-formed body of the closing member has a closing portion having a perimetral or cross-sectional dimension greater than a perimetral or cross-sectional dimension of the opening of the at least one through hole at the second end face of the sensor body, wherein at least one portion of the pre-formed body of the closing member is fixed in position in a fluid-tight way with respect to the at least one through hole, wherein the sensor body has an axial cavity, and wherein:

the axial cavity is closed at the first end face by a corresponding membrane and having an opening on the second end face, the axial cavity being configured to receive the fluid through the opening;

the plurality of electrically conductive tracks of the first electrical circuit pattern are arranged on the first end face, on a side thereof external to the axial cavity, there being electrically connected to the first electrical circuit pattern one or more circuit components for detecting bending or deformation of the membrane; and the second electrical circuit pattern has at least one electrically conductive track that is located in a region of the second end face that surrounds, at least partially, the opening of the axial cavity.

2. The sensor according to claim 1, wherein the at least one portion of the pre-formed body of the closing member is fixed in a fluid-tight way with respect to the at least one through hole by at least one of a fixing material and a sealing material.

3. The sensor according to claim 1, wherein the pre-formed body of the closing member extends outside of the at least one through hole or else extends partially inside the at least one through hole for a limited extent of a length of the hole.

4. The pressure sensor according to claim 2, wherein the at least one of the fixing material and the sealing material is set on at least one of:
the second end face of the sensor body;
the second end face of the sensor body and peripherally surrounding the closing portion of the pre-formed body;
a location between said second end face and a lower surface of the closing portion of the pre-formed body;
an inner surface of the at least one through hole;
the layer of electrically conductive material; and
at least part of a surface of a portion of the closing member which is inserted into the at least one through hole.

5. The pressure sensor according to claim 2, wherein the at least one of the fixing material and the sealing material comprises at least one of:
a weld;
a soldering material;
a resin;
a glue;

a material coating at least part of the pre-formed body; and
a material coating at least part of the second electrical circuit pattern.

6. The pressure sensor according to claim 1, wherein: the layer of electrically conductive material projects outward from the second end face of the sensor body, outside of the at least one through hole, forming a contact pad with the closing portion of the pre-formed body that rests on the contact pad.

7. The pressure sensor according to claim 6, wherein:
the perimetral or cross-sectional dimension of the closing portion of the pre-formed body and the perimetral or cross-sectional dimension of the contact pad are such that, for any position of centering of the closing portion with respect to the contact pad, a peripheral annular part of said contact pad projects laterally from said closing portion; and
at least one of a fixing material and a sealing material extends at least between an upper surface of said peripheral annular part of the contact pad and a peripheral surface of the closing portion of the pre-formed body.

8. The pressure sensor according to claim 1, wherein the pre-formed body has a positioning or centering portion having a perimetral or cross-sectional diameter, the positioning or centering portion extending underneath the closing portion, the positioning or centering portion being inserted in the at least one through hole.

9. The pressure sensor according to claim 8, wherein:
the opening of the at least one through hole at the second end face of the sensor body that is shaped so as to define a lead-in portion designed to facilitate insertion of the positioning or centering portion into the at least one through hole; and/or
the positioning or centering portion has a lower end shaped so as to facilitate insertion into the at least one through hole.

10. The pressure sensor according to claim 1, wherein the pre-formed body is made of: a first metal material; a first metal alloy; or a first material or first metal alloy coated at least in part with a second metal material or a second metal alloy.

11. The pressure sensor according to claim 1, wherein connected to the second electrical circuit pattern is at least one corresponding second circuit component having an active part that is to be exposed to the fluid for detecting a corresponding quantity of the fluid, and at least one first connection terminal and one second connection terminal.

12. The pressure sensor according to claim 1, wherein:
the second electrical circuit pattern comprises at least one of: an electrically conductive track with a substantially annular profile; and a plurality of electrically conductive tracks, each having a substantially arc-shaped profile; and
the opening of the at least one through hole closed by the closing member is located in a region of the second end face of the sensor body that is circumscribed by the electrically conductive track or the plurality of electrically conductive tracks of the second electrical circuit pattern.

13. The pressure sensor according to claim 1, wherein the second electrical circuit pattern has at least one electrically conductive track that is coated with a vitreous protective layer.

14. A device for detecting at least one quantity of a fluid, comprising a sensor according to claim 1, and a housing body having an inlet for the fluid, the housing body defining a housing in which the sensor is positioned,
wherein an annular sealing element is arranged between the second end face of the sensor body and an inner surface of the housing body,
the annular sealing element circumscribing a region of the second end face of the sensor body located within which is the opening of the at least one through hole.

15. The pressure sensor according to claim 1, wherein the at least one circuit component is electrically connected to the first electrical circuit pattern.

16. The pressure sensor according to claim 11, wherein the corresponding quantity of the fluid is a quantity of the fluid other than pressure.

17. The pressure sensor according to claim 1, wherein the at least one through hole is a metalized hole.

18. A pressure sensor, comprising a sensor body made at least in part of electrically insulating material, having a first end face and a second end face opposite to one another, the sensor further comprising a circuit arrangement supported at least in part by the sensor body and including:
  a first electrical circuit pattern, comprising a plurality of respective electrically conductive tracks on the first end face;
  at least one circuit component for detecting a pressure of a fluid;
  a second electrical circuit pattern on the second end face;
  connection elements which electrically connect the first electrical circuit pattern to the second electrical circuit pattern, comprising at least one through hole which extends axially between the first and second end faces of the sensor body, wherein on an internal surface of the at least one through hole a layer of electrically conductive material extends, ends of said layer being electrically connected to the first and second electrical circuit patterns; and
  a plurality of electrical terminals or contacts, for connection of the circuit arrangement to an external system, the terminals or contacts being electrically connected to at least one of the first electrical circuit pattern and the second electrical circuit pattern,
wherein the at least one through hole is closed at an opening thereof, at the second end face of the sensor body, by means of a closing member having a body that is at least in part pre-formed,
wherein the pre-formed body of the closing member has a closing portion having a perimetral or cross-sectional dimension greater than a perimetral or cross-sectional dimension of the opening of the at least one through hole at the second end face of the sensor body,
wherein at least one portion of the pre-formed body of the closing member is fixed in position in a fluid-tight way with respect to the at least one through hole,
wherein the sensor body has an axial cavity, and
wherein:
  the axial cavity is closed at the second end face by a corresponding membrane, the membrane comprising a side exposed to the fluid;
  the plurality of electrically conductive tracks of the first electrical circuit pattern are arranged on the first end face, on a side thereof external to the axial cavity, there being electrically connected to the first electrical circuit pattern at least one circuit component for detecting bending or deformation of the membrane, the at least one circuit component being arranged on a side of the membrane that faces an inside of the axial cavity; and
  the second electrical circuit pattern has at least one electrically conductive track that is located in a region of the second end face that surrounds, at least partially, the membrane.

* * * * *